(12) United States Patent
Luo et al.

(10) Patent No.: US 12,278,946 B2
(45) Date of Patent: Apr. 15, 2025

(54) METHODS AND APPARATUSES FOR SIGNALING PICTURE HEADER

(71) Applicant: ALIBABA GROUP HOLDING LIMITED, Grand Cayman (KY)

(72) Inventors: Jiancong Luo, Skillman, NJ (US); Jie Chen, Beijing (CN); Yan Ye, San Diego, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 321 days.

(21) Appl. No.: 17/214,722

(22) Filed: Mar. 26, 2021

(65) Prior Publication Data

US 2022/0060684 A1    Feb. 24, 2022

Related U.S. Application Data

(60) Provisional application No. 63/000,470, filed on Mar. 26, 2020.

(51) Int. Cl.
| | |
|---|---|
| H04N 19/105 | (2014.01) |
| H04N 19/169 | (2014.01) |
| H04N 19/172 | (2014.01) |
| H04N 19/46 | (2014.01) |
| H04N 19/70 | (2014.01) |

(52) U.S. Cl.
CPC ......... *H04N 19/105* (2014.11); *H04N 19/172* (2014.11); *H04N 19/188* (2014.11); *H04N 19/1883* (2014.11); *H04N 19/46* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 9,451,284 B2 * | 9/2016 | Wang | H04N 19/573 |
| 10,595,048 B1 * | 3/2020 | Wenger | H04N 19/66 |
| 10,674,170 B2 * | 6/2020 | Hannuksela | H04N 19/33 |
| 11,589,069 B2 * | 2/2023 | Deshpande | H04N 19/119 |

(Continued)

OTHER PUBLICATIONS

T. Stockhammer and M. M. Hannuksela, "H.264/AVC video for wireless transmission," in IEEE Wireless Communications, vol. 12, No. 4, pp. 6-13, Aug. 2005, doi: 10.1109/MWC.2005.1497853. (Year: 2005).*

(Continued)

*Primary Examiner* — Stefan Gadomski
(74) *Attorney, Agent, or Firm* — Finnegan, Henderson, Farabow, Garrett & Dunner, LLP

(57) ABSTRACT

The present disclosure provides methods and apparatuses for processing video content. The method can include: determining whether a picture-header (PH) network-abstraction-layer (NAL) unit is present in a picture unit (PU); in response to the PH NAL unit being present in the PU, determining a first video-coding-layer (VCL) NAL unit of the PU to be a first VCL NAL unit following the PH NAL unit, or in response to the PH NAL unit being not present in the PU, determining that the PU has only one VCL NAL unit and the first VCL NAL unit of the PU is the VCL NAL unit in the PU; and determining whether the first VCL NAL unit of the PU is the first VCL NAL unit of an access unit (AU) containing the PU.

18 Claims, 48 Drawing Sheets

(56) References Cited

U.S. PATENT DOCUMENTS

| | | | | |
|---|---|---|---|---|
| 2005/0265449 | A1* | 12/2005 | Yoon | H04N 19/44 |
| | | | | 375/E7.199 |
| 2012/0099643 | A1* | 4/2012 | Karegoudar | H04N 21/8547 |
| | | | | 375/240.06 |
| 2013/0114670 | A1 | 5/2013 | Chen et al. | |
| 2013/0194384 | A1* | 8/2013 | Hannuksela | H04N 19/70 |
| | | | | 348/43 |
| 2013/0195201 | A1* | 8/2013 | Boyce | H04N 19/44 |
| | | | | 375/240.25 |
| 2013/0343465 | A1* | 12/2013 | Chen | H04N 19/70 |
| | | | | 375/240.24 |
| 2014/0140406 | A1 | 5/2014 | Yu et al. | |
| 2015/0264366 | A1* | 9/2015 | Hendry | H04N 19/68 |
| | | | | 375/240.01 |
| 2021/0144384 | A1* | 5/2021 | Sjöberg | H04N 19/46 |
| 2021/0168404 | A1* | 6/2021 | Lim | H04N 19/513 |
| 2022/0053207 | A1* | 2/2022 | Deshpande | H04N 19/119 |
| 2022/0078486 | A1* | 3/2022 | Hannuksela | H04N 19/188 |
| 2022/0182620 | A1* | 6/2022 | Paluri | H04N 19/117 |
| 2022/0182681 | A1* | 6/2022 | Paluri | H04N 19/176 |

OTHER PUBLICATIONS

R. Sjoberg et al., "Overview of HEVC High-Level Syntax and Reference Picture Management," in IEEE Transactions on Circuits and Systems for Video Technology, vol. 22, No. 12, pp. 1858-1870, Dec. 2012, doi: 10.1109/TCSVT.2012.2223052. (Year: 2012).*

Sjöberg, R., Boyce, J. (2014). HEVC High-Level Syntax. In: Sze, V., Budagavi, M., Sullivan, G. (eds) High Efficiency Video Coding (HEVC). Integrated Circuits and Systems. Springer, Cham. https://doi.org/10.1007/978-3-319-06895-4_2 (Year: 2014).*

PCT International Search Report and Written Opinion mailed Jun. 10, 2021, issued in corresponding International Application No. PCT/US2021/024522 (7 pgs.).

"Requirements for a Future Video Coding Standard v5," International Organisation for Standardisation, Torino, IT, 14 pages (2017).

Bross et al., "Versatile Video Coding (Draft 8), "JVET-Q2001-vD, 17th Meeting: Brussels, BE, Jan. 7-17, 2020, 509 pages.

Chen et al., "Algorithm Description of Joint Exploration Test Model 7 (JEM 7)," JVET-G1001-v1, $7^{th}$ Meeting: Torino, IT, Jul. 13-21, 2017, 50 pages.

Chen et al., "Algorithm Description of Joint Exploration Test Model 8 (JEM 8)," JVET-Q2002-v1, $17^{th}$ Meeting: Brussels, BE, Jan. 7-17, 2020, 91 pages.

International Telecommunications Union "Series H: Audiovisual and Multimedia Systems Infrastructure of audiovisual services—Coding of moving video", ITU-T Telecommunication Standardization Sector of ITU, Apr. 2013, 317 pages.

JEM, https://jvet.hhi.fraunhofer.de/svn/svn_HMJEMSoftware.

Sullivan et al., "Overview of the High Efficiency Video Coding (HEVC) Standard," IEE Transactions on Circuits and Systems for Video Technology, vol. 22, No. 12, pp. 1649-1668 (2012).

* cited by examiner

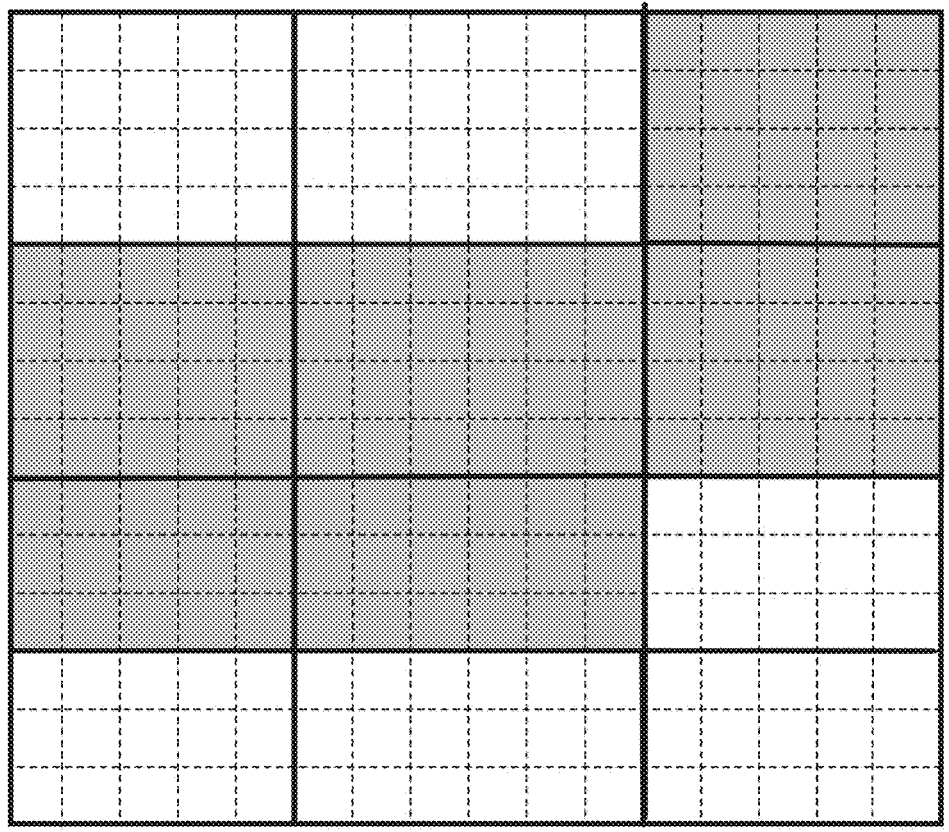
610
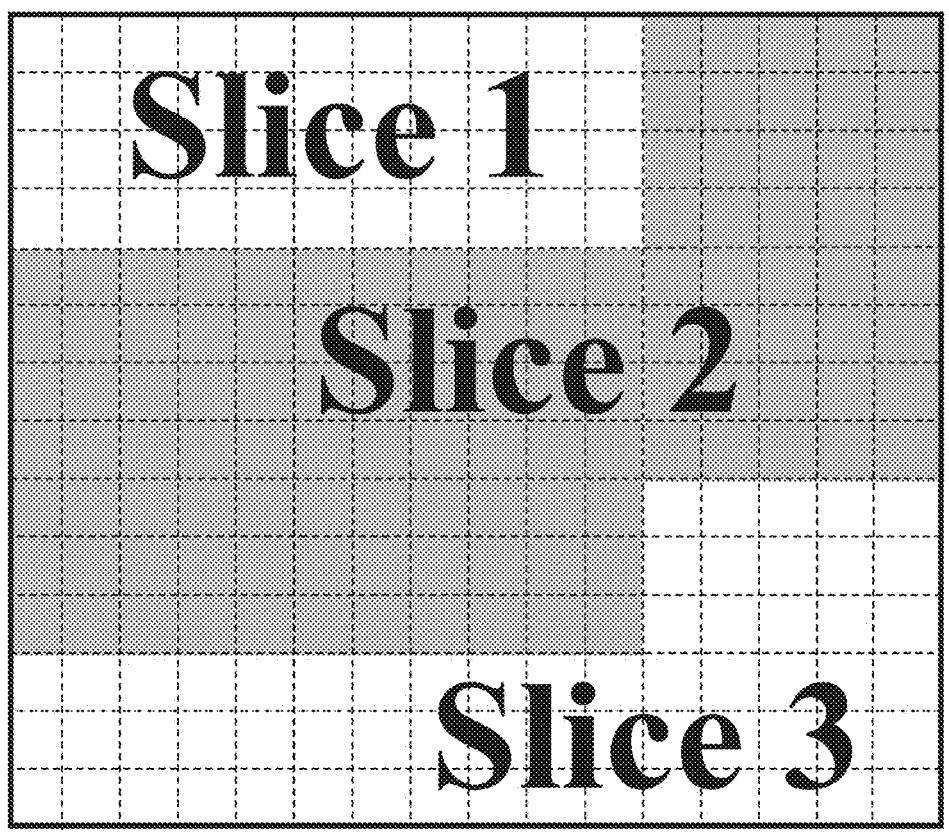
620
FIG. 6

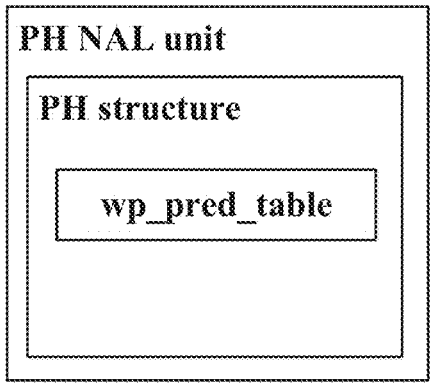
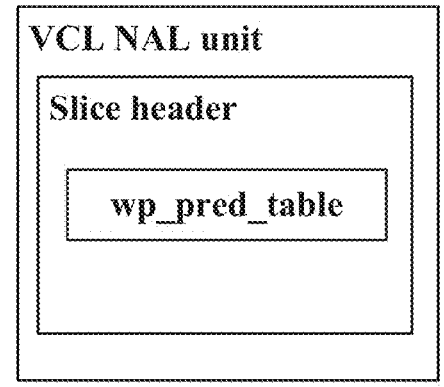
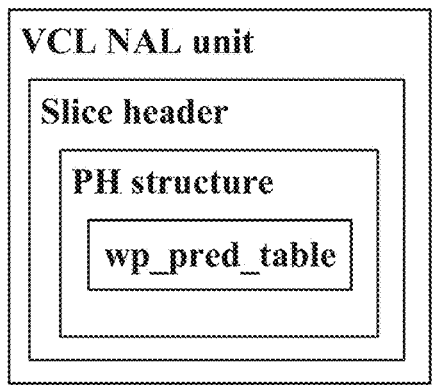
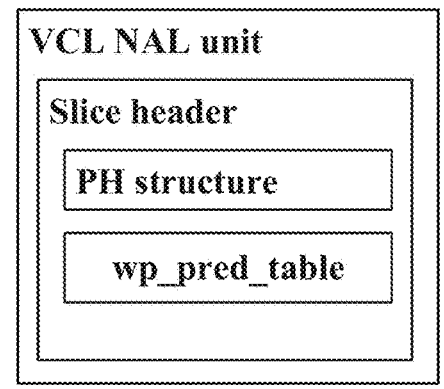
FIG. 10

7.3.2.7 Picture header RBSP syntax

| picture_header_rbsp( ) { | Descript or |
|---|---|
|   picture_header_structure( ) | |
|   rbsp_trailing_bits( ) | |
| } | |

7.3.2.10 General slice header syntax

| slice_header( ) { | Descript or |
|---|---|
|   picture_header_in_slice_header_flag | u(1) |
|   if( picture_header_in_slice_header_flag ) | |
|     picture_header_structure( ) | |
|   … | |

FIG. 16

| pic_parameter_set_rbsp( ) { | Descript or |
|---|---|
| ... | |
| if( ( pps_weighted_pred_flag \|\| pps_weighted_bipred_flag ) && rpl_present_in_ph_flag ) | |
| wp_info_in_ph_flag | u(1) |
| ... | |
| } | |

FIG. 17

| picture_header_structure( ) { | Descriptor |
|---|---|
| ... | u(1) |
|   if( ph_inter_slice_allowed_flag ) { | |
|     ... | |
|     if( ( pps_weighted_pred_flag \|\| pps_weighted_bipred_flag ) && wp_info_in_ph_flag ) | |
|       pred_weight_table( ) | |
|   } | |
|   ... | |
| } | |

FIG. 18

| slice_header( ) { | Descriptor |
|---|---|
| picture_header_in_slice_header_flag | u(1) |
| if( picture_header_in_slice_header_flag ) | |
| picture_header_structure( ) | |
| ... | |
| if( slice_type != I ) { | |
| ... | |
| if( !wp_info_in_ph_flag && ( ( pps_weighted_pred_flag && slice_type == P ) \|\| <br> ( pps_weighted_bipred_flag && slice_type == B ) ) ) | |
| pred_weight_table( ) | |
| } | |
| ... | |
| } | |

FIG. 19

| | Descriptor |
|---|---|
| pred_weight_table( ) { | |
|   luma_log2_weight_denom | ue(v) |
|   if( ChromaArrayType != 0 ) | |
|     delta_chroma_log2_weight_denom | se(v) |
|   if( wp_info_in_ph_flag ) | |
|     num_l0_weights | ue(v) |
|   for( i = 0; i < NumWeightsL0; i++ ) | |
|     luma_weight_l0_flag[ i ] | u(1) |
|   if( ChromaArrayType != 0 ) | |
|     for( i = 0; i < NumWeightsL0; i++ ) | |
|       chroma_weight_l0_flag[ i ] | u(1) |
|   for( i = 0; i < NumWeightsL0; i++ ) { | |
|     if( luma_weight_l0_flag[ i ] ) { | |
|       delta_luma_weight_l0[ i ] | se(v) |
|       luma_offset_l0[ i ] | se(v) |
|     } | |
|     if( chroma_weight_l0_flag[ i ] ) | |
|       for( j = 0; j < 2; j++ ) { | |
|         delta_chroma_weight_l0[ i ][ j ] | se(v) |
|         delta_chroma_offset_l0[ i ][ j ] | se(v) |
|       } | |
|   } | |
|   if( wp_info_in_ph_flag ) | |
|     num_l1_weights | ue(v) |
|   for( i = 0; i < NumWeightsL1; i++ ) | |
|     luma_weight_l1_flag[ i ] | u(1) |
|   if( ChromaArrayType != 0 ) | |
|     for( i = 0; i < NumWeightsL1; i++ ) | |
|       chroma_weight_l1_flag[ i ] | u(1) |
|   for( i = 0; i < NumWeightsL1; i++ ) { | |
|     if( luma_weight_l1_flag[ i ] ) { | |
|       delta_luma_weight_l1[ i ] | se(v) |
|       luma_offset_l1[ i ] | se(v) |
|     } | |
|     if( chroma_weight_l1_flag[ i ] ) | |
|       for( j = 0; j < 2; j++ ) { | |
|         delta_chroma_weight_l1[ i ][ j ] | se(v) |
|         delta_chroma_offset_l1[ i ][ j ] | se(v) |
|       } | |
|     } | |
|   } | |
| } | |

FIG. 20

If a PH NAL unit is present in a PU, let firstVclNalUnitInPic be the first VCL NAL unit that follows the PH NAL unit; otherwise let firstVclNalUnitInPic be the only one VCL NAL unit in a PU. A firstVlcNalUnitInPic is the first VCL NAL unit of an AU (and consequently the PU containing the VCL NAL unit is the first PU of the AU) when ~~the VCL NAL unit is the first VCL NAL unit that follows a PH NAL unit and~~ one or more of the following conditions are true:

- The value of nuh_layer_id of the VCL NAL unit is less than the nuh_layer_id of the previous picture in decoding order.
- The value of ph_pic_order_cnt_lsb of the VCL NAL unit differs from the ph_pic_order_cnt_lsb of the previous picture in decoding order.
- PicOrderCntVal derived for the VCL NAL unit differs from the PicOrderCntVal of the previous picture in decoding order.

FIG. 21

It is a requirement of bitstream conformance that each CVSS AU shall be either the first AU in the bitstream in decoding order or the next AU after a AU that contains an EOS NAL unit.

It is a requirement of bitstream conformance that each CLVSS PU shall be either the first PU in a particular layer of bitstream in decoding order or the next PU after a PU that belongs to the same layer and contains an EOS NAL unit.

~~When present,~~ the EOS RBSP specifies that the current PU is the last PU in the CLVS in decoding order and the next subsequent PU in the bitstream in decoding order (if any) is an IRAP or GDR PU or IDR PU. The syntax content of the SODB and RBSP for the EOS RBSP are empty. If the picture is the first picture of a layer in the bitstream in decoding order, ~~an IDR picture,~~ or the first picture of a layer that follows an EOS NAL unit of the layer in decoding order, the variable NoOutputBeforeRecoveryFlag for the picture is set equal to 1.

FIG. 22

| slice_header( ) { | Descript or |
|---|---|
| picture_header_in_slice_header_flag | u(1) |
| if( picture_header_in_slice_header_flag) | |
| picture_header_structure( ) | |
| ... | |

FIG. 23

| slice_header( ) { | Descript or |
|---|---|
| if(PictureHeaderInSliceHeader) | |
| picture_header_structure( ) | |
| ... | |

FIG. 24

The variable PictureHeaderInSliceHeader is derived as the follows:

If the current VCL NAL unit is the first VCL NAL unit in a CLVS,

- If the current VCL NAL unit follows a PH NAL unit, the PictureHeaderInSliceHeader is set to 0
- Otherwise PictureHeaderInSliceHeader is set to 1

Otherwise, the PictureHeaderInSliceHeader is set to the value of PictureHeaderInSliceHeader in the previous PU in the same CLVS.

It is a requirement of bitstream conformance that the PH NAL unit is either present in all PU in a CLVS or not present in a CLVS.

FIG. 25

| picture_header_structure( ) { | Descriptor |
|---|---|
| ... | u(1) |
| ~~ph_pic_order_cnt_lsb~~ | ~~u(v)~~ |
| ... | u(1) |
| ~~if( sps_poc_msb_flag ) {~~ | |
| ~~ph_poc_msb_present_flag~~ | ~~u(1)~~ |
| ~~if( ph_poc_msb_present_flag )~~ | |
| ~~poc_msb_val~~ | ~~u(v)~~ |
| ~~}~~ | |
| ... | |

| slice_header( ) { | Descriptor | Change |
|---|---|---|
| ph_pic_order_cnt_lsb | u(v) | 1 |
| if( sps_poc_msb_flag ) { | | 2 |
| ph_poc_msb_present_flag | u(1) | 3 |
| if( ph_poc_msb_present_flag ) | | 4 |
| poc_msb_val | u(v) | 5 |
| } | | 6 |
| ~~picture_header_in_slice_header_flag~~ | ~~u(1)~~ | 7 |
| if( ~~picture_header_in_slice_header_flag~~ PictureHeaderInSliceHeader) | | 8 |
| picture_header_structure( ) | | |
| ... | | |

1-6: the above syntax is added.

7: the syntax is removed.

8: "picture_header_in_slice_header_flag" is replaced with "PictureHeaderInSliceHeader."

FIG. 26

A VCL NAL unit is the first VCL NAL unit in a PU when any of the following conditions are true:

1. nuh_layer_id is different than that of the previous VCL NAL unit
2. ph_pic_order_cnt_lsb or PicOrderCntVal is different than that of the previous VCL NAL unit.

The variable PictureHeaderInSliceHeader is derived for each VCL NAL unit as the follows:

If the VCL NAL unit follows a PH NAL unit, or is not the first VCL NAL unit in a PU, the PictureHeaderInSliceHeader of the VCL NAL unit is set to 0, Otherwise, the PictureHeaderInSliceHeader is set to 1

It is a requirement of bitstream conformance that the PH NAL unit is either present in all PU in a CLVS or not present in a CLVS.

~~It is a requirement of bitstream conformance that the value of picture_header_in_slice_header_flag shall be the same in all coded slices in a CLVS.~~

~~When picture_header_in_slice_header_flag is equal to 1 for a coded slice, it is a requirement of bitstream conformance that no VCL NAL unit with nal_unit_type equal to PH_NUT shall be present in the CLVS.~~

~~When picture_header_in_slice_header_flag is equal to 0, all coded slices in the current picture shall have picture_header_in_slice_header_flag is equal to 0, and the current PU shall have a PH NAL unit.~~

FIG. 27

| slice_header( ) { | Descriptor | Change |
|---|---|---|
| slice_pic_parameter_set_id | ue(v) | |
| ~~picture_header_in_slice_header_flag~~ | ~~u(1)~~ | 1 |
| if( ~~picture_header_in_slice_header_flag~~ PictureHeaderInSliceHeader) | | 2 |
| picture_header_structure( ) | | |
| ... | | |

1: the syntax is removed.

2: "picture_header_in_slice_header_flag" is replaced with "PictureHeaderInSliceHeader."

slice_pic_parameter_set_id specifies the value of pps_pic_parameter_set_id for the PPS in use. The value of slice_pic_parameter_set_id shall be in the range of 0 to 63, inclusive.

It is a requirement of bitstream conformance that the value of TemporalId of the slice shall be greater than or equal to the value of TemporalId of the PPS that has pps_pic_parameter_set_id equal to slice_pic_parameter_set_id.

The above descriptions are added.

| picture_header_rbsp( ) { | Descriptor | Change |
|---|---|---|
| PictureHeaderInSliceHeader = 0 | | 1 |
| picture_header_structure( ) | | |
| rbsp_trailing_bits( ) | | |
| } | | |

1: the syntax is added.

| picture_header_structure( ) { | Descriptor | Change |
|---|---|---|
| ... | | |
| if ( !PictureHeaderInSliceHeader) | | 1 |
| ph_pic_parameter_set_id | ue(v) | |
| ... | | |

1: the syntax is added.

FIG. 28

~~ph_pic_parameter_set_id specifies the value of pps_pic_parameter_set_id for the PPS in use. The value of ph_pic_parameter_set_id shall be in the range of 0 to 63, inclusive.~~

~~It is a requirement of bitstream conformance that the value of TemporalId of the PH shall be greater than or equal to the value of TemporalId of the PPS that has pps_pic_parameter_set_id equal to ph_pic_parameter_set_id.~~

<u>The variable PrevSliceCount is the value of SliceCount of previous VCL NAL unit, the variable SliceCount is derived for each VCL NAL unit as followings:</u>

- <u>If the current VCL NAL unit is the first VCL NAL unit in the bitstream or the value slice_pic_parameter_set_id is different with that of the previous VCL NAL unit, or SliceCount is equal to num_slices_in_pic_minus1,</u>
    <u>SliceCount is set to 0</u>
- <u>Otherwise,</u>
    <u>SliceCount = SliceCount + 1</u>

<u>A VCL NAL unit is the first VCL NAL unit in a PU if SliceCount == 0.</u>

<u>For a VCL NAL unit, the variable PictureHeaderInSliceHeader is derived as the follows:</u>

<u>If a VCL NAL unit follows a PH NAL unit, or is not the first VCL NAL unit in a PU, the PictureHeaderInSliceHeader of this VCL NAL unit is set to 0,</u>

<u>Otherwise, the PictureHeaderInSliceHeader is set to 1</u>

<u>It is a requirement of bitstream conformance that the PH NAL unit is either present in all PU in a CLVS or not present in a CLVS.</u>

~~It is a requirement of bitstream conformance that the value of picture_header_in_slice_header_flag shall be the same in all coded slices in a CLVS.~~

~~When picture_header_in_slice_header_flag is equal to 1 for a coded slice, it is a requirement of bitstream conformance that no VCL NAL unit with nal_unit_type equal to PH_NUT shall be present in the CLVS.~~

~~When picture_header_in_slice_header_flag is equal to 0, all coded slices in the current picture shall have picture_header_in_slice_header_flag is equal to 0, and the current PU shall have a PH NAL unit.~~

FIG. 29

| ~~picture_header_rbsp( ) {~~ | Descript or |
|---|---|
| ~~picture_header_structure( )~~ | |
| ~~rbsp_trailing_bits( )~~ | |
| ~~}~~ | |

| slice_layer_rbsp( ) { | Descript or | Change |
|---|---|---|
| first_slice_flag | u(1) | 1 |
| if ( first_slice_flag ) | | 2 |
| picture_header_structure( ) | | 3 |
| slice_header( ) | | |
| slice_data( ) | | |
| rbsp_slice_trailing_bits( ) | | |
| } | | |

1-3: the syntax is added.

first_slice_flag indicates whether the slice is the first slice of the picture.

| slice_header( ) { | Descript or |
|---|---|
| ~~picture_header_in_slice_header_flag~~ | ~~u(1)~~ |
| ~~if( picture_header_in_slice_header_flag )~~ | |
| ~~picture_header_structure( )~~ | |
| ... | |
| } | |

FIG. 30

~~It is a requirement of bitstream conformance that the value of picture_header_in_slice_header_flag shall be the same in all coded slices in a CLVS.~~

~~When picture_header_in_slice_header_flag is equal to 1 for a coded slice, it is a requirement of bitstream conformance that no VCL NAL unit with nal_unit_type equal to PH_NUT shall be present in the CLVS.~~

~~When picture_header_in_slice_header_flag is equal to 0, all coded slices in the current picture shall have picture_header_in_slice_header_flag is equal to 0, and the current PU shall have a PH NAL unit.~~

A PU consists of ~~zero or one PH NAL unit,~~ one coded picture, which comprises of one or more VCL NAL units, and zero or more other non-VCL NAL units.

~~When a picture consists of more than one VCL NAL unit, a PH NAL unit shall be present in the PU~~

FIG. 31

| seq_parameter_set_rbsp( ) { | Descript or | Change |
|---|---|---|
| sps_seq_parameter_set_id | u(4) | |
| sps_video_parameter_set_id | u(4) | |
| sps_max_sublayers_minus1 | u(3) | |
| sps_reserved_zero_4bits | u(4) | |
| sps_ptl_dpb_hrd_params_present_flag | u(1) | |
| if( sps_ptl_dpb_hrd_params_present_flag ) | | |
| profile_tier_level( 1, sps_max_sublayers_minus1 ) | | |
| sps_single_slice_per_picture_flag | u(1) | 1 |
| if(sps_single_slice_per_picture_flag) | | 2 |
| sps_ph_nal_unit_present_flag | u(1) | 3 |
| gdr_enabled_flag | u(1) | |

1-3: the syntax is added.

FIG. 32 sps_single_slice_per_picture_flag equal to 1 specifies each picture referring the SPS consists of one and only one slice. sps_single_slice_per_picture equal to 0 specifies at least one picture referring to the SPS consists of more than one slice.

sps_ph_nal_unit_present_flag equal to 1 specifies PH NAL unit is present in the CLVS referring to the SPS. Sps_ph_nal_unit_present equal to 0 specifies PH NAL unit is not present in the CLVS referring to the SPS. When not present, the value of sps_ph_nal_unit_present is inferred to be 1.

FIG. 33 picture_header_in_slice_header_flag equal to 1 specifies that the PH syntax structure is present in the slice header. picture_header_in_slice_header_flag equal to 0 specifies that the PH syntax structure is not present in the slice header.

<u>It is a requirement of bitstream conformance that the value of picture_header_in_slice_header_flag shall not be equal to the value of sps_ph_nal_unit_present.</u> num_slices_in_pic_minus1 plus 1 specifies the number of rectangular slices in each picture referring to the PPS. The value of num_slices_in_pic_minus1 shall be in the range of 0 to MaxSlicesPerPicture − 1, inclusive, where MaxSlicesPerPicture is specified in Annex A. When no_pic_partition_flag is equal to 1, the value of num_slices_in_pic_minus1 is inferred to be equal to 0.

<u>It is a requirement of bitstream conformance that when sps_single_slice_per_picture equal to 1, the value of num_slices_in_pic_minus1 shall be equal to 0.</u>

~~It is a requirement of bitstream conformance that the value of picture_header_in_slice_header_flag shall be the same in all coded slices in a CLVS.~~

~~When picture_header_in_slice_header_flag is equal to 1 for a coded slice, it is a requirement of bitstream conformance that no VCL NAL unit with nal_unit_type equal to PH_NUT shall be present in the CLVS.~~

~~When picture_header_in_slice_header_flag is equal to 0, all coded slices in the current picture shall have picture_header_in_slice_header_flag is equal to 0, and the current PU shall have a PH NAL unit.~~

~~When a picture consists of more than one VCL NAL unit, a PH NAL unit shall be present in the PU~~

FIG. 34

| seq_parameter_set_rbsp( ) { | Descript or | Change |
|---|---|---|
| sps_seq_parameter_set_id | u(4) | |
| sps_video_parameter_set_id | u(4) | |
| sps_max_sublayers_minus1 | u(3) | |
| sps_reserved_zero_4bits | u(4) | |
| sps_ptl_dpb_hrd_params_present_flag | u(1) | |
| if( sps_ptl_dpb_hrd_params_present_flag ) | | |
| profile_tier_level( 1, sps_max_sublayers_minus1 ) | | |
| sps_single_slice_per_picture | u(1) | 1 |
| gdr_enabled_flag | u(1) | |

1: the syntax is added.

FIG. 35 sps_single_slice_per_picture equal to 1 specifies each picture referring the SPS consists of one and only one slice. sps_single_slice_per_picture equal to 0 specifies each picture referring to the SPS consists of one or more slice.

FIG. 36 picture_header_in_slice_header_flag equal to 1 specifies that the PH syntax structure is present in the slice header. picture_header_in_slice_header_flag equal to 0 specifies that the PH syntax structure is not present in the slice header.

It is a requirement of bitstream conformance that the value of picture_header_in_slice_header_flag shall be equal to the value of sps_single_slice_per_picture.

num_slices_in_pic_minus1 plus 1 specifies the number of rectangular slices in each picture referring to the PPS. The value of num_slices_in_pic_minus1 shall be in the range of 0 to MaxSlicesPerPicture − 1, inclusive, where MaxSlicesPerPicture is specified in Annex A. When no_pic_partition_flag is equal to 1, the value of num_slices_in_pic_minus1 is inferred to be equal to 0.

It is a requirement of bitstream conformance that when sps_single_slice_per_picture equal to 1, the value of num_slices_in_pic_minus1 shall be equal to 0.

~~It is a requirement of bitstream conformance that the value of picture_header_in_slice_header_flag shall be the same in all coded slices in a CLVS.~~

~~When picture_header_in_slice_header_flag is equal to 1 for a coded slice, it is a requirement of bitstream conformance that no VCL NAL unit with nal_unit_type equal to PH_NUT shall be present in the CLVS.~~

~~When picture_header_in_slice_header_flag is equal to 0, all coded slices in the current picture shall have picture_header_in_slice_header_flag is equal to 0, and the current PU shall have a PH NAL unit.~~

~~When a picture consists of more than one VCL NAL unit, a PH NAL unit shall be present in the PU~~

FIG. 37

| seq_parameter_set_rbsp( ) { | Descript or | Change |
|---|---|---|
| ... | | |
|    subpic_info_present_flag | u(1) | |
|    if( subpic_info_present_flag ) { | | |
|       if(!sps_single_slice_per_picture) | | 1 |
|       sps_num_subpics_minus1 | ue(v) | |
|       sps_independent_subpics_flag | u(1) | |
|       for( i = 0; sps_num_subpics_minus1 > 0 && i <= sps_num_subpics_minus1; i++ ) { | | |
|         if( i > 0 && pic_width_max_in_luma_samples > CtbSizeY ) | | |
|           subpic_ctu_top_left_x[ i ] | u(v) | |
|         if( i > 0 && pic_height_max_in_luma_samples > CtbSizeY ) { | | |
|           subpic_ctu_top_left_y[ i ] | u(v) | |
|         if( i < sps_num_subpics_minus1 && <br>           pic_width_max_in_luma_samples > CtbSizeY ) | | |
|           subpic_width_minus1[ i ] | u(v) | |
|         if( i < sps_num_subpics_minus1 && <br>           pic_height_max_in_luma_samples > CtbSizeY ) | | |
|           subpic_height_minus1[ i ] | u(v) | |
|         if( !sps_independent_subpics_flag) { | | |
|           subpic_treated_as_pic_flag[ i ] | u(1) | |
|           loop_filter_across_subpic_enabled_flag[ i ] | u(1) | |
|         } | | |
|       } | | |

1: the syntax is added.

FIG. 38

| picture_header_rbsp( ) { | Descriptor | Change |
|---|---|---|
| PictureHeaderInSliceHeaderFlag = 0 | | 1 |
| picture_header_structure( ) | | |
| rbsp_trailing_bits( ) | | |
| } | | |

1: "PictureHeaderInSliceHeaderFlag = 0" is added.

| picture_header_structure( ) { | Descriptor | Change |
|---|---|---|
| ... | u(1) | |
| if( ph_inter_slice_allowed_flag ) { | | |
| ... | | |
| if( ( pps_weighted_pred_flag \|\| pps_weighted_bipred_flag ) && wp_info_in_ph_flag && !PictureHeaderInSliceHeaderFlag ) | | 1 |
| pred_weight_table( ) | | |
| } | | |
| ... | | |
| } | | |

1: "&& !PictureHeaderInSliceHeaderFlag" is added.

| slice_header( ) { | Descriptor | Change |
|---|---|---|
| picture_header_in_slice_header_flag | u(1) | |
| PictureHeaderInSliceHeaderFlag = picture_header_in_slice_header_flag | | 1 |
| if( ~~picture_header_in_slice_header_flag~~ PictureHeaderInSliceHeaderFlag ) | | 2 |
| picture_header_structure( ) | | |
| ... | | |
| if( slice_type != I ) { | | |
| ... | | |
| if( ( PictureHeaderInSliceHeaderFlag \|\| !wp_info_in_ph_flag ) && ( ( pps_weighted_pred_flag && slice_type == P ) \|\| ( pps_weighted_bipred_flag && slice_type == B ) ) ) | | 3 |
| pred_weight_table( ) | | |
| } | | |
| ... | | |
| } | | |

1: "PictureHeaderInSliceHeaderFlag = picture_header_in_slice_header_flag" is added.

2: "picture_header_in_slice_header_flag" is replaced with "PictureHeaderInSliceHeaderFlag."

3: "PictureHeaderInSliceHeaderFlag \|\|" is added.

FIG. 39

| pred_weight_table( ) { | Descriptor | Change |
|---|---|---|
|   luma_log2_weight_denom | ue(v) | |
|   if( ChromaArrayType != 0 ) | | |
|     delta_chroma_log2_weight_denom | se(v) | |
|   if( wp_info_in_ph_flag ) | | |
|     num_l0_weights | ue(v) | |
|   for( i = 0; i < NumWeightsL0; i++ ) | | |
|     luma_weight_l0_flag[ i ] | u(1) | |
|   if( ChromaArrayType != 0 ) | | |
|     for( i = 0; i < NumWeightsL0; i++ ) | | |
|       chroma_weight_l0_flag[ i ] | u(1) | |
|   for( i = 0; i < NumWeightsL0; i++ ) { | | |
|     if( luma_weight_l0_flag[ i ] ) { | | |
|       delta_luma_weight_l0[ i ] | se(v) | |
|       luma_offset_l0[ i ] | se(v) | |
|     } | | |
|     if( chroma_weight_l0_flag[ i ] ) | | |
|       for( j = 0; j < 2; j++ ) { | | |
|         delta_chroma_weight_l0[ i ][ j ] | se(v) | |
|         delta_chroma_offset_l0[ i ][ j ] | se(v) | |
|       } | | |
|   } | | |
|   if( wp_info_in_ph_flag && !PictureHeaderInSliceHeaderFlag) | | 1 |
|     num_l1_weights | ue(v) | |
|   for( i = 0; i < NumWeightsL1; i++ ) | | |
|     luma_weight_l1_flag[ i ] | u(1) | |
|   if( ChromaArrayType != 0 ) | | |
|     for( i = 0; i < NumWeightsL1; i++ ) | | |
|       chroma_weight_l1_flag[ i ] | u(1) | |
|   for( i = 0; i < NumWeightsL1; i++ ) { | | |
|     if( luma_weight_l1_flag[ i ] ) { | | |
|       delta_luma_weight_l1[ i ] | se(v) | |
|       luma_offset_l1[ i ] | se(v) | |
|     } | | |
|     if( chroma_weight_l1_flag[ i ] ) | | |
|       for( j = 0; j < 2; j++ ) { | | |
|         delta_chroma_weight_l1[ i ][ j ] | se(v) | |
|         delta_chroma_offset_l1[ i ][ j ] | se(v) | |
|       } | | |
|     } | | |
|   } | | |
| } | | |

1: "&& !PictureHeaderInSliceHeaderFlag" is added.

FIG. 39 (continued)

num_l1_weights specifies the number of weights signalled for entries in reference picture list 1 when wp_info_in_ph_flag is equal to 1 and the variable PictureHeaderInSliceHeaderFlag is equal to 0. The value of num_l1_weights shall be in the range of 0 to num_ref_entries[ 1 ][ RplsIdx[ 1 ] ], inclusive.

If wp_info_in_ph_flag is equal to 1 and the variable PictureHeaderInSliceHeaderFlag is equal to 0, the variable NumWeightsL1 is set equal to num_l1_weights. Otherwise (wp_info_in_ph_flag is equal to 0), NumWeightsL1 is set equal to NumRefIdxActive[ 1 ].

FIG. 40

| pic_parameter_set_rbsp( ) { | Descriptor | Change |
|---|---|---|
| ... | | |
| ~~if( ( pps_weighted_pred_flag \|\| pps_weighted_bipred_flag ) && rpl_present_in_ph_flag )~~ | | 1 |
| ~~wp_info_in_ph_flag~~ | ~~u(1)~~ | 2 |
| ... | | |
| } | | |

The above of 1 and 2 are removed.

FIG. 41

~~wp_info_in_ph_flag~~ ~~equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_in_ph_flag is inferred to be equal to 0.~~

| picture_header_structure( ) { | Descriptor | Change |
|---|---|---|
| ... | u(1) | |
| if( ph_inter_slice_allowed_flag ) { | | |
| ... | | |
| ~~if( ( pps_weighted_pred_flag \|\| pps_weighted_bipred_flag ) && wp_info_in_ph_flag )~~ | | 1 |
| ~~pred_weight_table( )~~ | | 2 |
| } | | |
| ... | | |
| } | | |

1 and 2: the syntax is removed.

| slice_header( ) { | Descriptor | Change |
|---|---|---|
| picture_header_in_slice_header_flag | u(1) | |
| if( picture_header_in_slice_header_flag ) | | |
| picture_header_structure( ) | | |
| ... | | |
| if( slice_type != I ) { | | |
| ... | | |
| if( ~~!wp_info_in_ph_flag &&~~ ( ( pps_weighted_pred_flag && slice_type == P ) \|\|<br>( pps_weighted_bipred_flag && slice_type == B ) ) ) | | 1 |
| pred_weight_table( ) | | |
| } | | |
| ... | | |
| } | | |

1: "!wp_info_in_ph_flag &&" is removed.

FIG. 42

| pred_weight_table( ) { | Descriptor | Change |
|---|---|---|
|    luma_log2_weight_denom | ue(v) | |
|    if( ChromaArrayType != 0 ) | | |
|       delta_chroma_log2_weight_denom | se(v) | |
|    ~~if( wp_info_in_ph_flag )~~ | | 1 |
|       ~~num_l0_weights~~ | ~~ue(v)~~ | 2 |
|    for( i = 0; i < ~~NumWeightsL0~~ NumRefIdxActive[ 0 ]; i++ ) | | 3 |
|       luma_weight_l0_flag[ i ] | u(1) | |
|    if( ChromaArrayType != 0 ) | | |
|       for( i = 0; i < ~~NumWeightsL0~~ NumRefIdxActive[ 0 ]; i++ ) | | 4 |
|          chroma_weight_l0_flag[ i ] | u(1) | |
|    for( i = 0; i < ~~NumWeightsL0~~ NumRefIdxActive[ 0 ]; i++ ) { | | 5 |
|       if( luma_weight_l0_flag[ i ] ) { | | |
|          delta_luma_weight_l0[ i ] | se(v) | |
|          luma_offset_l0[ i ] | se(v) | |
|       } | | |
|       if( chroma_weight_l0_flag[ i ] ) | | |
|          for( j = 0; j < 2; j++ ) { | | |
|             delta_chroma_weight_l0[ i ][ j ] | se(v) | |
|             delta_chroma_offset_l0[ i ][ j ] | se(v) | |
|          } | | |
|    } | | |
|    ~~if( wp_info_in_ph_flag )~~ | | 6 |
|       ~~num_l1_weights~~ | ~~ue(v)~~ | 7 |
|    for( i = 0; i < ~~NumWeightsL1~~ NumRefIdxActive[ 1 ]; i++ ) | | 8 |
|       luma_weight_l1_flag[ i ] | u(1) | |
|    if( ChromaArrayType != 0 ) | | |
|       for( i = 0; i < ~~NumWeightsL1~~ NumRefIdxActive[ 1 ]; i++ ) | | 9 |
|          chroma_weight_l1_flag[ i ] | u(1) | |
|    for( i = 0; i < ~~NumWeightsL1~~ NumRefIdxActive[ 1 ]; i++ ) { | | 10 |
|       if( luma_weight_l1_flag[ i ] ) { | | |
|          delta_luma_weight_l1[ i ] | se(v) | |
|          luma_offset_l1[ i ] | se(v) | |
|       } | | |
|       if( chroma_weight_l1_flag[ i ] ) | | |
|          for( j = 0; j < 2; j++ ) { | | |
|             delta_chroma_weight_l1[ i ][ j ] | se(v) | |
|             delta_chroma_offset_l1[ i ][ j ] | se(v) | |
|          } | | |
|    } | | |
| } | | |

1, 2, 6, and 7: syntax is removed.

3-5 and 8-10: "NumWeightsL1" is replaced with "NumRefIdxActive[ 1 ]."

FIG. 42 (continued)

~~num_l0_weights specifies the number of weights signalled for entries in reference picture list 0 when wp_info_in_ph_flag is equal to 1. The value of num_l0_weights shall be in the range of 0 to num_ref_entries[ 0 ][ RplsIdx[ 0 ] ], inclusive.~~

~~If wp_info_in_ph_flag is equal to 1, the variable NumWeightsL0 is set equal to num_l0_weights. Otherwise (wp_info_in_ph_flag is equal to 0), NumWeightsL0 is set equal to NumRefIdxActive[ 0 ].~~

~~num_l1_weights specifies the number of weights signalled for entries in reference picture list 1 when wp_info_in_ph_flag is equal to 1. The value of num_l1_weights shall be in the range of 0 to num_ref_entries[ 1 ][ RplsIdx[ 1 ] ], inclusive.~~

~~If wp_info_in_ph_flag is equal to 1, the variable NumWeightsL1 is set equal to num_l1_weights. Otherwise (wp_info_in_ph_flag is equal to 0), NumWeightsL1 is set equal to NumRefIdxActive[ 1 ].~~

FIG. 43

It is a requirement for bitstream conformance that when wp_info_in_ph_flag is equal to 1, the value of picture_header_in_slice_header_flag shall be equal to 0.

FIG. 44

METHODS AND APPARATUSES FOR SIGNALING PICTURE HEADER

CROSS-REFERENCE TO RELATED APPLICATIONS

The present disclosure claims priority to U.S. provisional application No. 63/000,470, filed on Mar. 26, 2020, which is incorporated herein by reference in its entirety.

TECHNICAL FIELD

The present disclosure generally relates to video processing, and more particularly, to methods and apparatuses for signaling picture headers.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (e.g., HEVC/H.265) standard, the Versatile Video Coding (e.g., VVC/H.266) standard, and AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

Embodiments of the present disclosure provide a method and apparatus for processing video content. The method can include: determining whether a picture-header (PH) network-abstraction-layer (NAL) unit is present in a picture unit (PU); in response to the PH NAL unit being present in the PU, determining a first video-coding-layer (VCL) NAL unit of the PU to be a first VCL NAL unit following the PH NAL unit, or in response to the PH NAL unit being not present in the PU, determining that the PU has only one VCL NAL unit and the first VCL NAL unit of the PU is the VCL NAL unit in the PU; and determining whether the first VCL NAL unit of the PU is the first VCL NAL unit of an access unit (AU) containing the PU.

The apparatus can include a memory storing a set of instructions; and one or more processors configured to execute the set of instructions to cause the apparatus to perform: determining whether a picture-header (PH) network-abstraction-layer (NAL) unit is present in a picture unit (PU); in response to the PH NAL unit being present in the PU, determining a first video-coding-layer (VCL) NAL unit of the PU to be a first VCL NAL unit following the PH NAL unit, or in response to the PH NAL unit being not present in the PU, determining that the PU has only one VCL NAL unit and the first VCL NAL unit of the PU is the VCL NAL unit in the PU; and determining whether the first VCL NAL unit of the PU is the first VCL NAL unit of an access unit (AU) containing the PU.

The embodiments of the present disclosure further provide a non-transitory computer readable medium that stores a set of instructions that is executable by at least one processor of a computer to cause the computer to perform a method for processing video content, the method comprising: determining whether a picture-header (PH) network-abstraction-layer (NAL) unit is present in a picture unit (PU); in response to the PH NAL unit being present in the PU, determining a first video-coding-layer (VCL) NAL unit of the PU to be a first VCL NAL unit following the PH NAL unit, or in response to the PH NAL unit being not present in the PU, determining that the PU has only one VCL NAL unit and the first VCL NAL unit of the PU is the VCL NAL unit in the PU; and determining whether the first VCL NAL unit of the PU is the first VCL NAL unit of an access unit (AU) containing the PU.

Embodiments of the present disclosure provide a method and apparatus for processing video content. The method can include: in response to receiving an end-of-sequence (EOS) network-abstraction-layer (NAL) unit, determining that an end of a picture unit (PU) has reached.

The apparatus can include a memory storing a set of instructions; and one or more processors configured to execute the set of instructions to cause the apparatus to perform: in response to receiving an end-of-sequence (EOS) network-abstraction-layer (NAL) unit, determining that an end of a picture unit (PU) has reached.

The embodiments of the present disclosure further provide a non-transitory computer readable medium that stores a set of instructions that is executable by at least one processor of a computer to cause the computer to perform a method for processing video content, the method comprising: in response to receiving an end-of-sequence (EOS) network-abstraction-layer (NAL) unit, determining that an end of a picture unit (PU) has reached.

Embodiments of the present disclosure provide a method and apparatus for processing video content. The method can include: determining whether a value of a parameter of a first video-coding-layer (VCL) network-abstraction-layer (NAL) unit of a picture unit (PU) is different from a value of a parameter of a previous picture; and in response to the value of the parameter of the first VCL NAL unit of the first VCL NAL unit of the PU being different from the value of the parameter of the previous picture, determining that the first VCL NAL unit is a first VCL NAL unit in an access unit (AU).

The apparatus can include a memory storing a set of instructions; and one or more processors configured to execute the set of instructions to cause the apparatus to perform: determining whether a value of a parameter of a first video-coding-layer (VCL) network-abstraction-layer (NAL) unit of a picture unit (PU) is different from a value of a parameter of a previous picture; and in response to the value of the parameter of the first VCL NAL unit of the PU being different from the value of the parameter of the previous picture, determining that the first VCL NAL unit is a first VCL NAL unit in an access unit (AU).

The embodiments of the present disclosure further provide a non-transitory computer readable medium that stores a set of instructions that is executable by at least one processor of a computer to cause the computer to perform a method for processing video content, the method comprising: determining whether a value of a parameter of a first video-coding-layer (VCL) network-abstraction-layer (NAL) unit of a picture unit (PU) is different from a value of a parameter of a previous picture; and in response to the value of the parameter of the first VCL NAL unit of the first VCL NAL unit of the PU being different from the value of the parameter of the previous picture, determining that the first VCL NAL unit is a first VCL NAL unit in an access unit (AU).

Embodiments of the present disclosure provide a method and apparatus for processing video content. The method can include: in response to a slice type being signaled in a slice header, determining whether the slice type is a B slice; and in response to the slice type being the B slice, signaling one or more weighted prediction parameters for a reference list in the slice header.

The apparatus can include a memory storing a set of instructions; and one or more processors configured to execute the set of instructions to cause the apparatus to perform: in response to a slice type being signaled in a slice header, determining whether the slice type is a B slice; and in response to the slice type being the B slice, signaling one or more weighted prediction parameters for a reference list in the slice header.

The embodiments of the present disclosure further provide a non-transitory computer readable medium that stores a set of instructions that is executable by at least one processor of a computer to cause the computer to perform a method for processing video content, the method comprising: in response to a slice type being signaled in a slice header, determining whether the slice type is a B slice; and in response to the slice type being the B slice, signaling one or more weighted prediction parameters for a reference list in the slice header.

Embodiments of the present disclosure provide a method and apparatus for processing video content. The method can include: determining whether one or more weighted prediction parameters are signaled in a picture header syntax structure; and in response to the one or more weighted prediction parameters having been signaled in the picture header syntax structure, determining that the picture header syntax structure is not signaled in a slice header.

The apparatus can include a memory storing a set of instructions; and one or more processors configured to execute the set of instructions to cause the apparatus to perform: determining whether one or more weighted prediction parameters are signaled in a picture header syntax structure; and in response to the one or more weighted prediction parameters having been signaled in the picture header syntax structure, determining that the picture header syntax structure is not signaled in a slice header.

The embodiments of the present disclosure further provide a non-transitory computer readable medium that stores a set of instructions that is executable by at least one processor of a computer to cause the computer to perform a method for processing video content, the method comprising: determining whether one or more weighted prediction parameters are signaled in a picture header syntax structure; and in response to the one or more weighted prediction parameters having been signaled in the picture header syntax structure, determining that the picture header syntax structure is not signaled in a slice header.

BRIEF DESCRIPTION OF THE DRAWINGS

Embodiments and various aspects of the present disclosure are illustrated in the following detailed description and the accompanying figures. Various features shown in the figures are not drawn to scale.

FIG. 6 illustrates exemplary raster-scan slice partitioning of a picture, consistent with some embodiments of the present disclosure.

FIG. 10 illustrates various exemplary picture header syntax structures, consistent with some embodiments of the present disclosure.

FIG. 16 shows the syntax of picture_header_rbsp( ) (the payload of picture header NAL unit) and the syntax of slice_header( ) in VVC draft 8.

FIG. 17 shows signaling of wp_info_in_ph_flag in a picture parameter set (PPS) according to VVC draft 8.

FIG. 18 shows signaling of pred_weight_table syntax structure in a picture header according to VVC draft 8.

FIG. 19 shows signaling of picture_header_structure and pred_weight_table in a slice header according to VVC draft 8.

FIG. 20 shows signaling of weighted prediction parameters according to VVC draft 8.

FIG. 21 shows a modified definition of the first VCL NAL unit in an AU, consistent with some embodiments of the present disclosure.

FIG. 22 shows proposed changes made to the VVC specification or a similar specification, consistent with some embodiments of the present disclosure.

FIG. 23 shows the slice_header syntax in VVC draft 8.

FIG. 24 shows proposed changes to the slice_header syntax of FIG. 23, consistent with some embodiments of the present disclosure.

FIG. 25 shows proposed changes made to the VVC specification or a similar specification, consistent with some embodiments of the present disclosure.

FIG. 26 shows proposed changes made to the VVC specification or a similar specification, consistent with some embodiments of the present disclosure.

FIG. 27 shows proposed changes made to the VVC specification or a similar specification, consistent with some embodiments of the present disclosure.

FIG. 28 shows proposed changes made to the VVC specification or a similar specification, consistent with some embodiments of the present disclosure.

FIG. 29 shows proposed changes made to the VVC specification or a similar specification, consistent with some embodiments of the present disclosure.

FIG. 30 shows proposed changes made to the VVC specification or a similar specification, consistent with some embodiments of the present disclosure.

FIG. 31 shows proposed changes made to the VVC specification or a similar specification, consistent with some embodiments of the present disclosure.

FIG. 32 shows proposed changes made to the VVC specification or a similar specification, consistent with some embodiments of the present disclosure.

FIG. 33 shows proposed changes made to the VVC specification or a similar specification, consistent with some embodiments of the present disclosure.

FIG. 34 shows proposed changes made to the VVC specification or a similar specification, consistent with some embodiments of the present disclosure.

FIG. 35 shows proposed changes made to the VVC specification or a similar specification, consistent with some embodiments of the present disclosure.

FIG. 36 shows proposed changes made to the VVC specification or a similar specification, consistent with some embodiments of the present disclosure.

FIG. 37 shows proposed changes made to the VVC specification or a similar specification, consistent with some embodiments of the present disclosure.

FIG. 38 shows proposed changes made to the VVC specification or a similar specification, consistent with some embodiments of the present disclosure.

FIG. 39 shows proposed changes made to the VVC specification or a similar specification, consistent with some embodiments of the present disclosure.

FIG. 40 shows proposed changes made to the VVC specification or a similar specification, consistent with some embodiments of the present disclosure.

FIG. 41 shows proposed changes made to the VVC specification or a similar specification, consistent with some embodiments of the present disclosure.

FIG. 42 shows proposed changes made to the VVC specification or a similar specification, consistent with some embodiments of the present disclosure.

FIG. 43 shows proposed changes made to the VVC specification or a similar specification, consistent with some embodiments of the present disclosure.

FIG. 44 shows proposed changes made to the VVC specification or a similar specification, consistent with some embodiments of the present disclosure.

DETAILED DESCRIPTION

Figure 1:
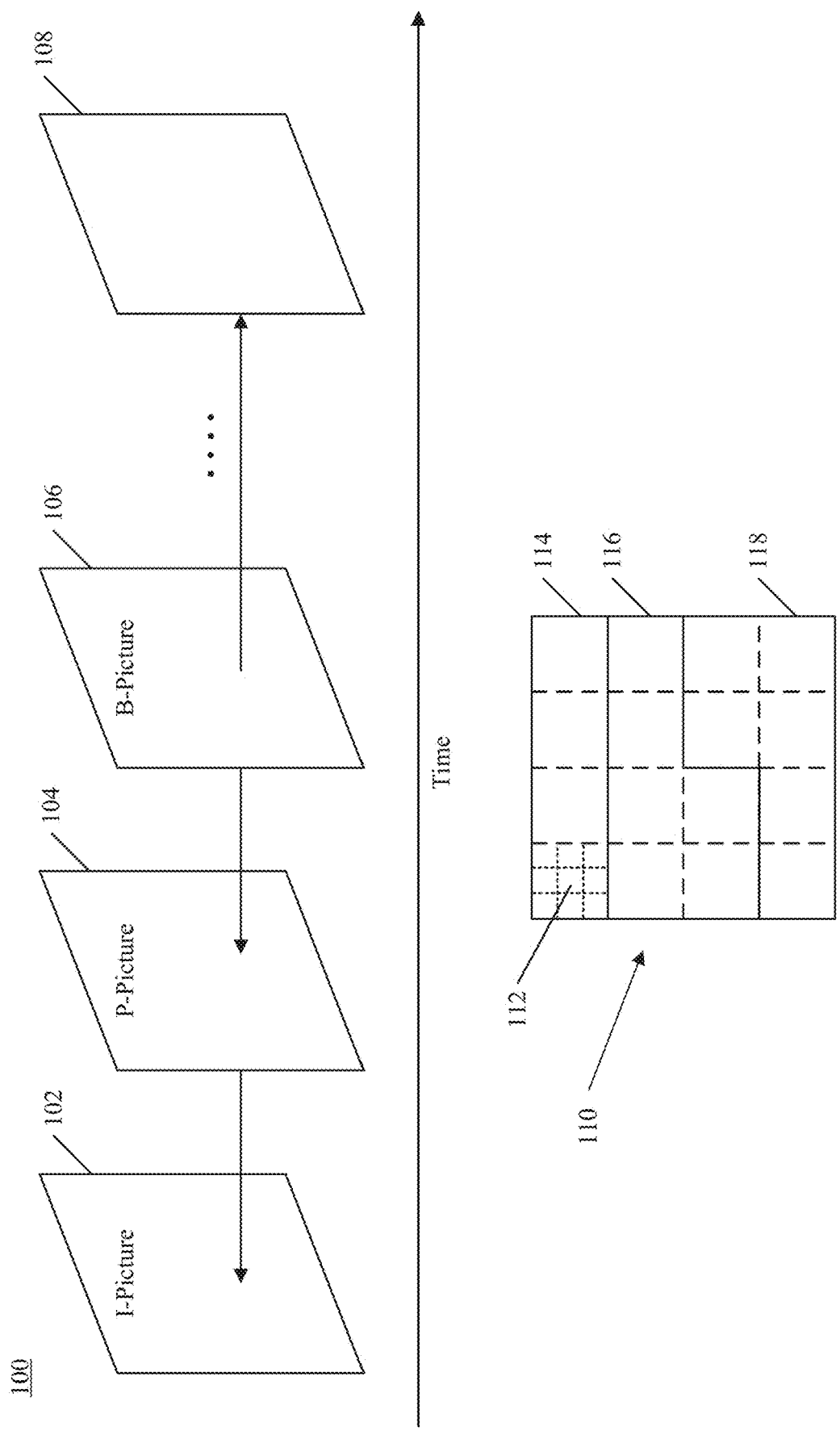
FIG. 1 illustrates a schematic diagram illustrating structures of an example video sequence, consistent with some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recent, and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

The present disclosure is directed to methods and apparatuses for processing video content consistent with above-described video coding standards.

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit. A CTU is the largest block unit and can include as many as 128×128 luma samples (plus the corresponding chroma samples depending on the chroma format). A CTU may be further partitioned into coding units (CUs) using quad-tree, binary tree, ternary tree, or a combination thereof.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs.

It should also be noted that different stages can divide the basic processing units using different schemes.

Figure 2A:
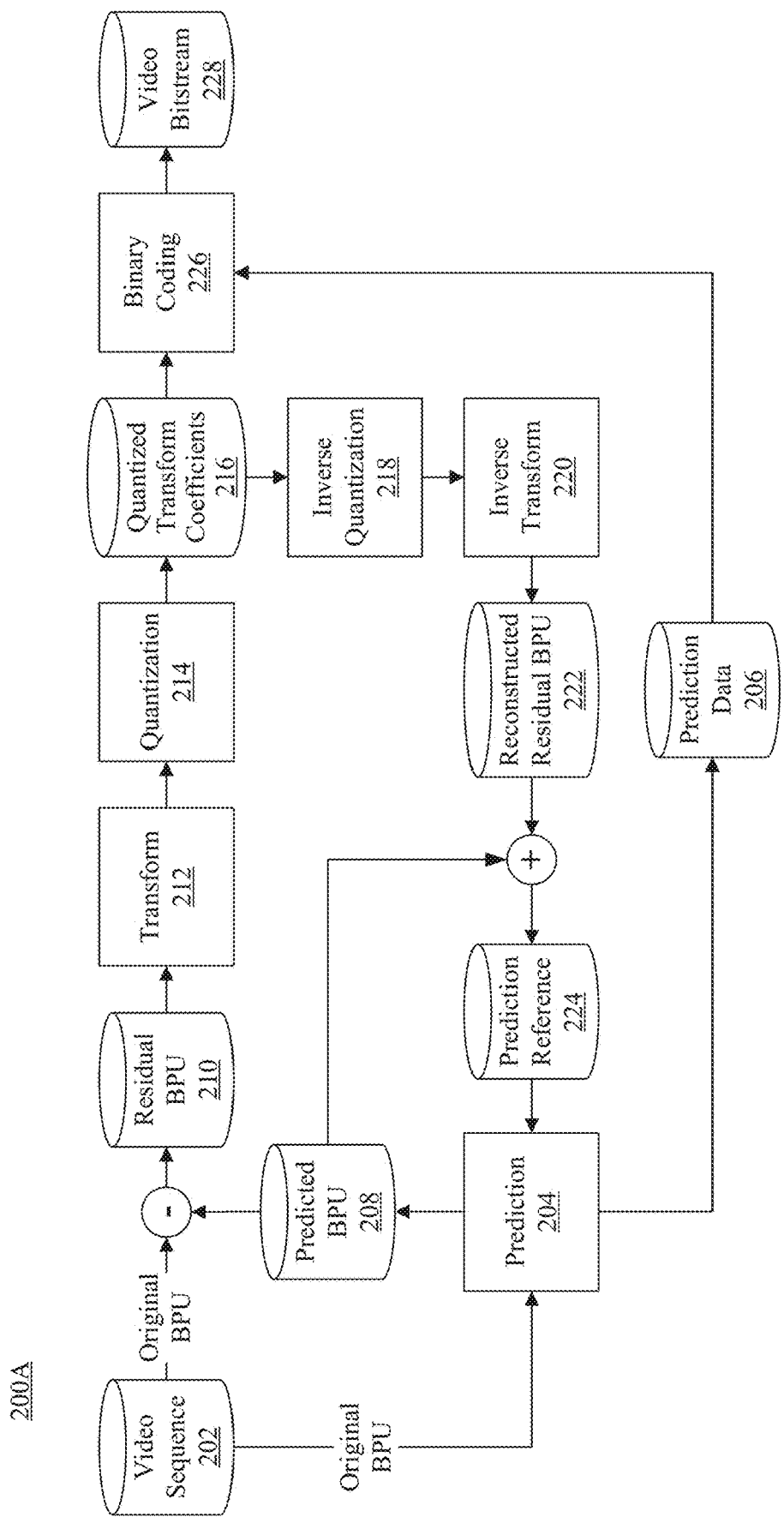
FIG. 2A illustrates a schematic diagram illustrating an exemplary encoding process of a hybrid video coding system, consistent with some embodiments of the present disclosure.
Figure 2B:
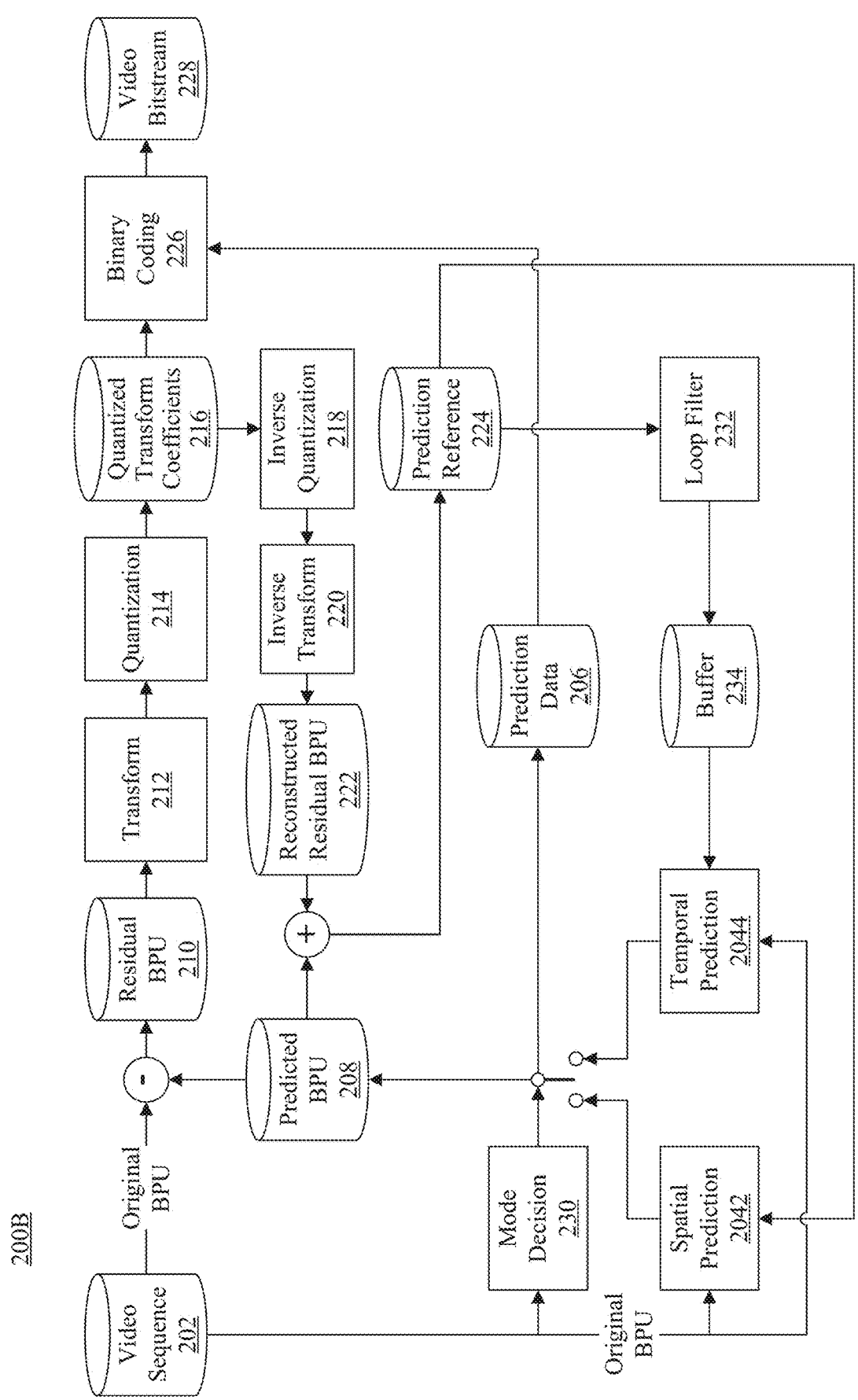
FIG. 2B illustrates a schematic diagram illustrating another exemplary encoding process of a hybrid video coding system, consistent with some embodiments of the present disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder may record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
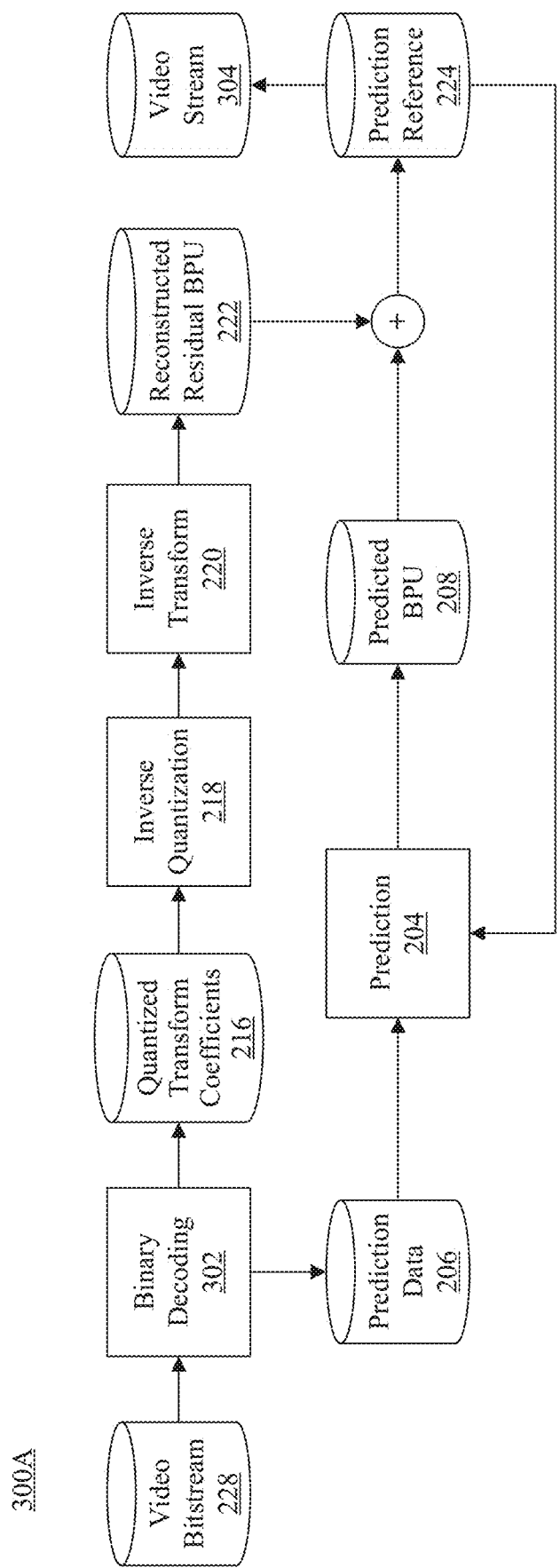
FIG. 3A illustrates a schematic diagram illustrating an exemplary decoding process of a hybrid video coding system, consistent with some embodiments of the present disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
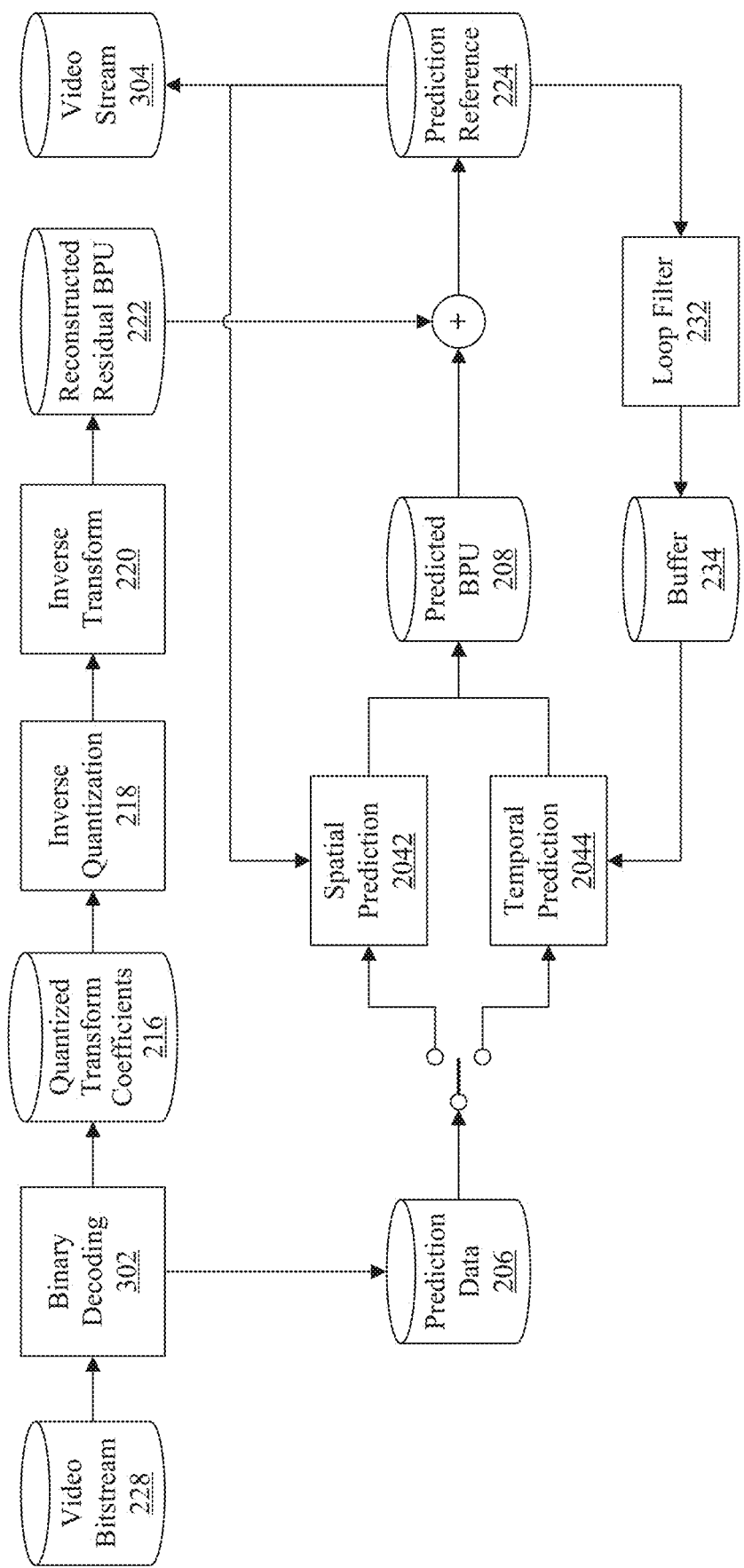
FIG. 3B illustrates a schematic diagram illustrating another exemplary decoding process of a hybrid video coding system, consistent with some embodiments of the present disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
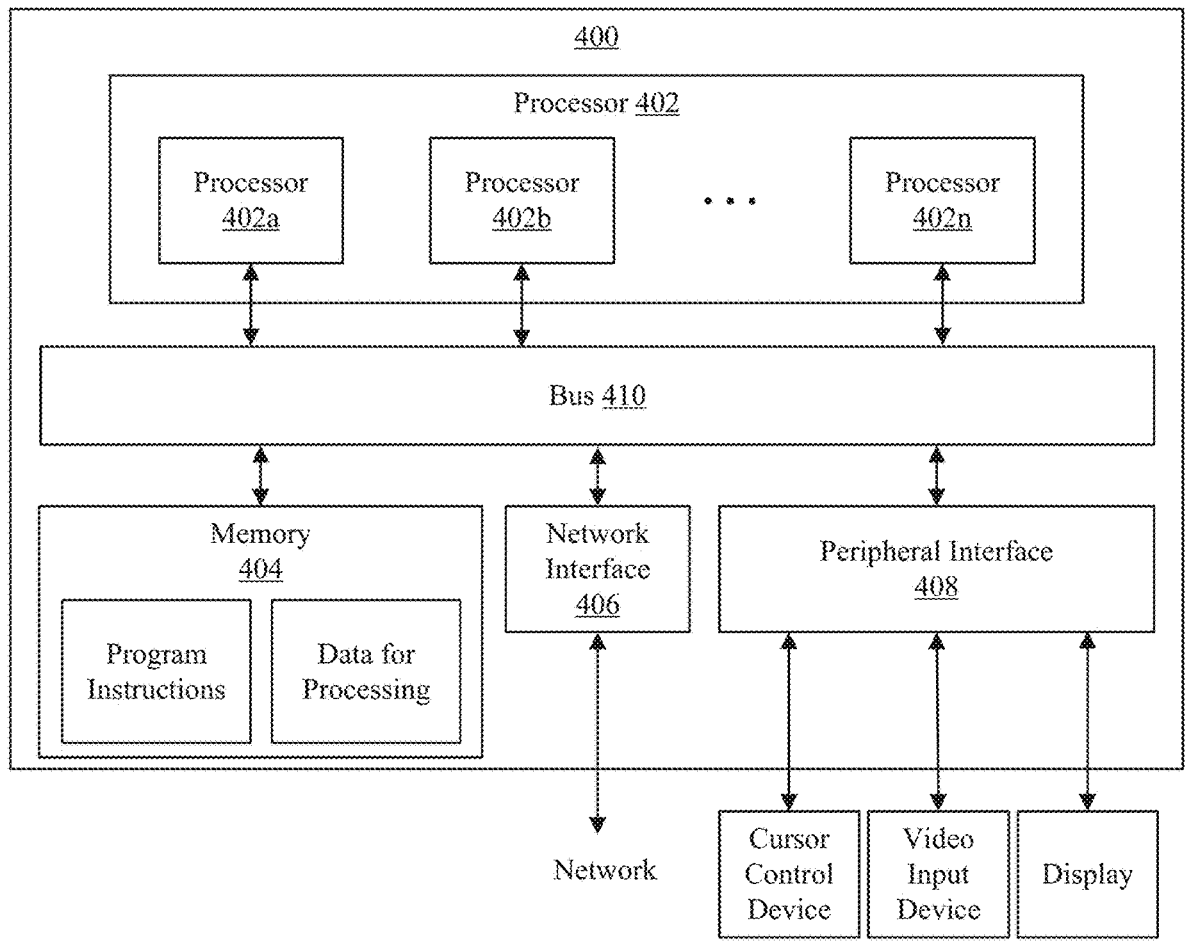
FIG. 4 illustrates a block diagram of an exemplary apparatus for encoding or decoding a video, consistent with some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In VVC draft 8, a picture is partitioned into a sequence of CTUs and multiple CTUs form a tile, a slice, and a subpicture. The partitioning of a picture into subpicture, slice, tile and CTUs are described as follows.

Figure 5:
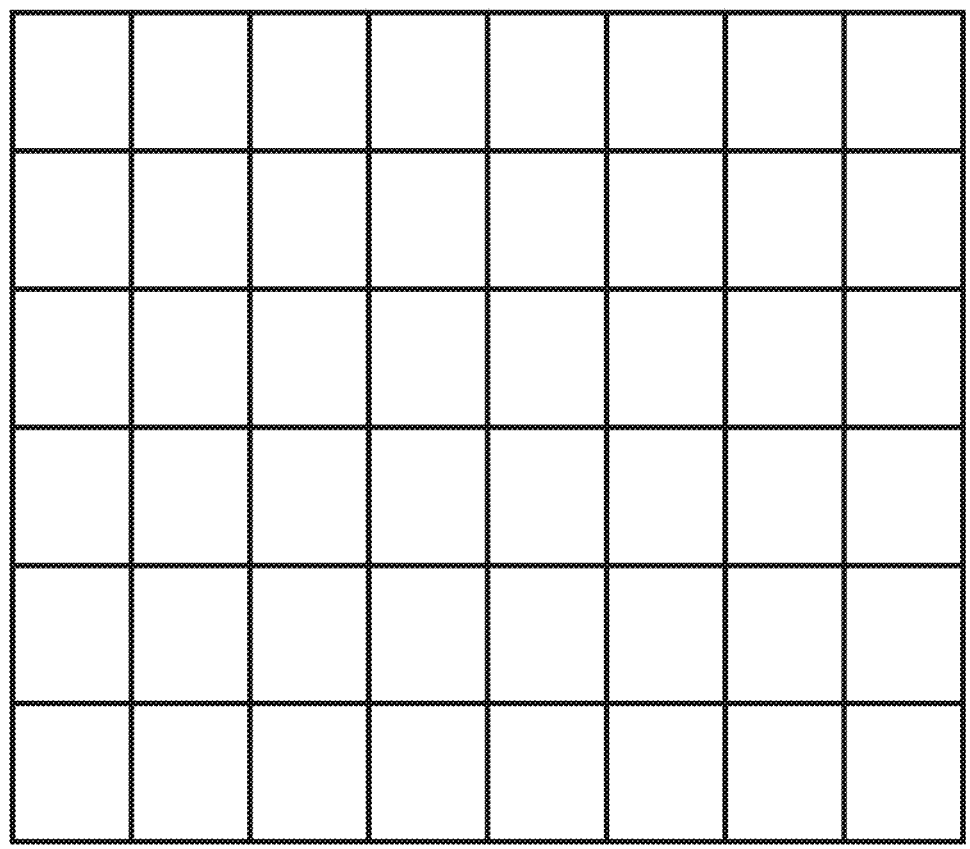
FIG. 5 illustrates an exemplary picture divided into a plurality of coding tree units (CTUs), consistent with some embodiments of the present disclosure.

Pictures are divided into a plurality of coding tree units (CTUs). For a picture that has three sample arrays of three-color components, a CTU consists of an N×N block of luma samples together with two corresponding blocks of chroma samples. FIG. 5 shows the example of a picture divided into CTUs.

The maximum allowed size of the luma block in a CTU is specified to be 128×128 (although the maximum size of the luma transform blocks is 64×64) and the minimum allowed size of the luma block in a CTU is specified to be 32×32.

A picture is divided into one or more tile rows and one or more tile columns. A tile is a sequence of CTUs that covers a rectangular region of a picture.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

FIG. 6 shows an example of raster-scan slice partitioning of a picture, where the picture is divided into 12 tiles (4 tile rows and 3 tile columns) and 3 raster-scan slices. Picture 610 and picture 620 are the same picture. Picture 610 illustrates the tile partition. The upper partitioning shows that the tiles are marked with thick lines. Picture 620 illustrates the slice partition. The 3 raster-scan slices are shown as slices 1-3.

Figure 7:
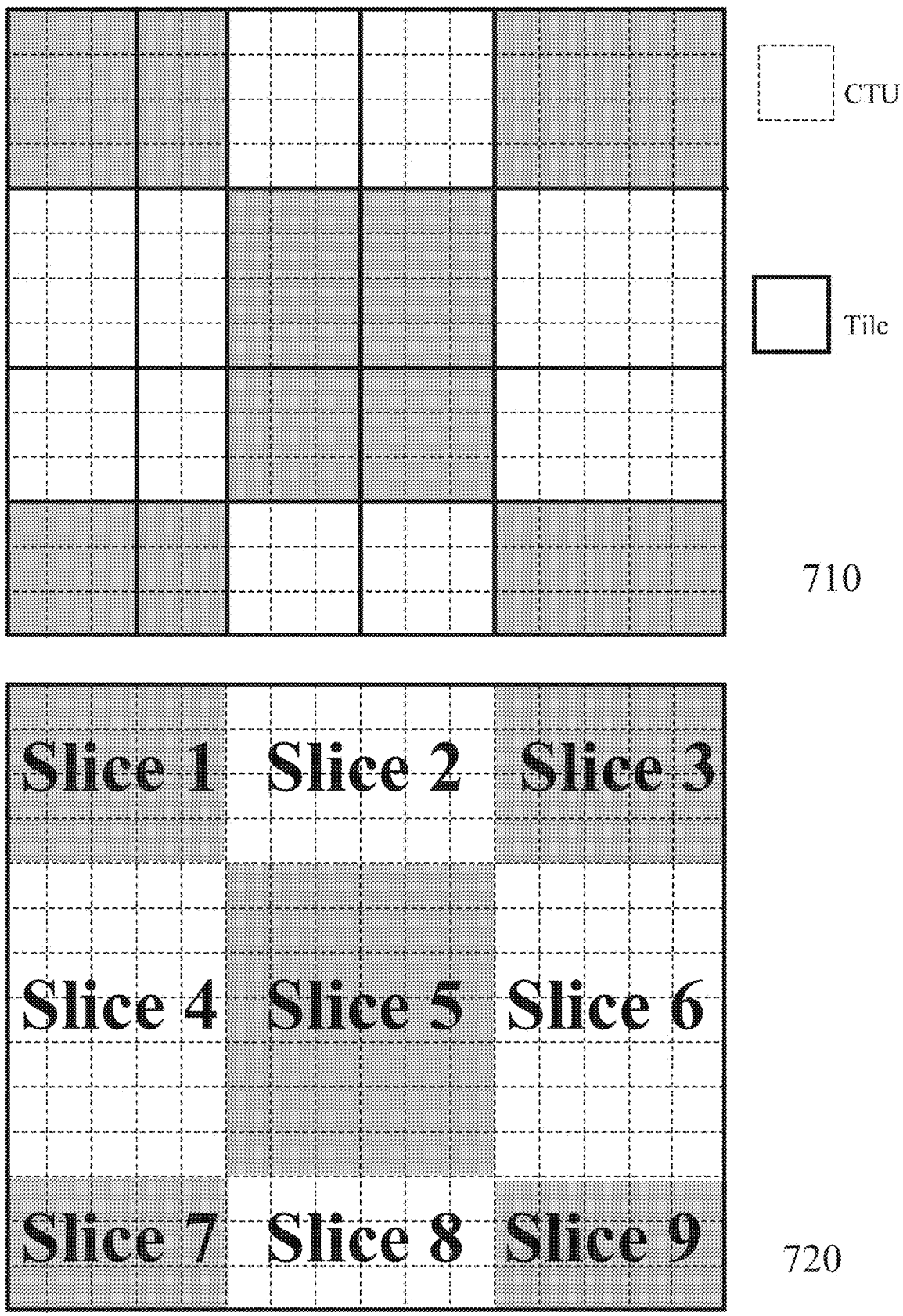
FIG. 7 illustrates exemplary slice partitioning of a picture, consistent with some embodiments of the present disclosure.

FIG. 7 shows an example of rectangular slice partitioning of a picture, where the picture is divided into 20 tiles (5 tile columns and 4 tile rows) and 9 rectangular slices. Picture 710 and picture 720 are the same picture. Picture 710 illustrates the tile partition. Picture 720 illustrates the slice partition. The 9 rectangular slices are shown as slices 1-9 in picture 720.

Figure 8:
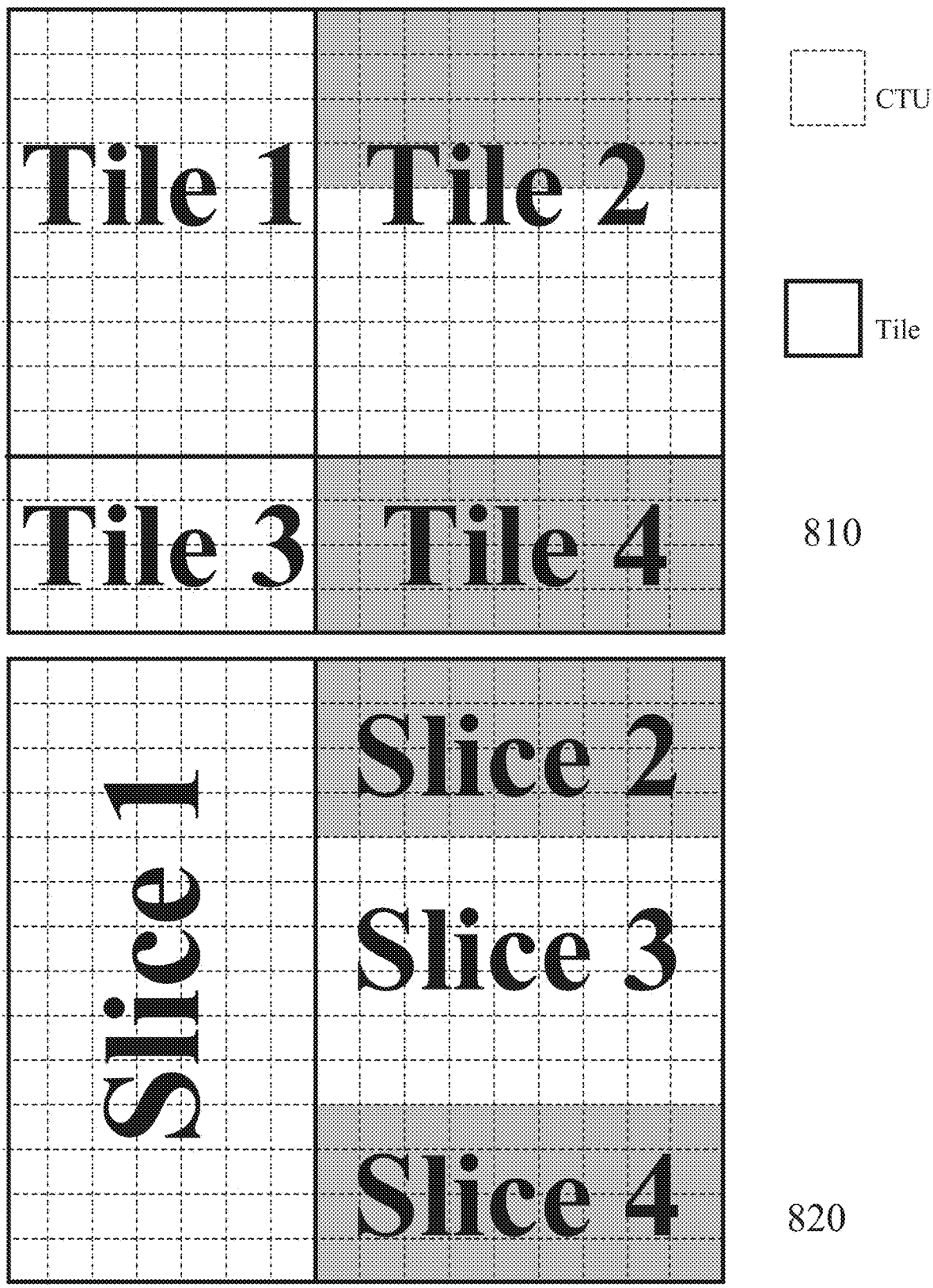
FIG. 8 illustrates an exemplary picture partitioned into tiles and rectangular slices, consistent with some embodiments of the present disclosure.

FIG. 8 shows an example of a picture partitioned into tiles and rectangular slices, where the picture is divided into 4 tiles (2 tile columns and 2 tile rows) and 4 rectangular slices. Picture 810 and picture 820 are the same picture. Picture 810 illustrates the tile partition. Picture 820 illustrates the slice partition. The 4 rectangular slices are shown as slices 1-4 in picture 820.

In VVC draft 8, picture header structure is a syntax structure carrying syntax elements common to the slices of a picture. Picture header structure may be present in a separate NAL unit with NAL unit type PH_NUT following by the first VCL NAL unit of the picture unit or present in the slice header syntax structure. When a picture header structure is present in a separate NAL unit with NAL unit type PH_NUT, the picture unit may consist of one or more slices. Otherwise, when a picture header structure presents in slice header, the picture unit may consist of only one slice. Moreover, the presence of picture header NAL unit in a picture unit may be consistent for all picture units in a coded layer video sequence (CLVS). The presence of picture header structure in slice header is indicated by a flag picture_header_in_slice_header_flag signaled at the beginning of the slice header.

The syntax of picture_header_rbsp( ) (the payload of picture header NAL unit) and the syntax of slice_header( ) in VVC draft 8 are shown in FIG. 16.

In VVC draft 8, a bitstream consists of one or more coded video sequences (CVSs). A CVS which may contains coded pictures from different layers consists of a coded video sequence start CVSS) access unit (AU) followed by zero or more AUs. An AU is a set of picture units (PUs) that belong to different layers and contain coded pictures associated with the same time for output from the decoded picture buffer (DPB). Each layer of a CVS is a coded layer video sequence (CLVS) which consists of a coded layer video sequence start (CLVSS) PU followed by zero or more PUs belonging to the same layer.

PUs in an AU is in increasing order of nuh_layer_id. A PU consists of a set of network-abstraction-layer (NAL) units in decoding order. A NAL unit can be categorized to two types: a video coded layer (VCL) NAL unit or a non-video coded layer (non-VCL) NAL. VCL NAL unit is a collective term for coded slice NAL units and the subset of NAL units that have reserved values of nal_unit_type that are classified as VCL NAL units in VVC draft 8.

A PU consists of zero or one PH NAL unit, one coded picture, which comprises of one or more VCL NAL units, and zero or more other non-VCL NAL units.

When a picture consists of more than one VCL NAL unit, a PH NAL unit shall be present in the PU.

If a PH NAL unit is present in a PU, the first VCL NAL unit of a picture is the first VCL NAL unit that follows the PH NAL unit in decoding order of the picture. Otherwise (no PH NAL unit is present in the PU), the first VCL NAL unit of a picture is the only VCL NAL unit of the picture.

It is important to identify the first VCL NAL in an AU since it contains the first slice of the first PU in an AU.

A VCL NAL unit is the first VCL NAL unit of an AU (and consequently the PU containing the VCL NAL unit is the first PU of the AU) when the VCL NAL unit is the first VCL NAL unit that follows a PH NAL unit and one or more of the following conditions are true:

The value of nuh_layer_id of the VCL NAL unit is less than the nuh_layer_id of the previous picture in decoding order.

The value of ph_pic_order_cnt_lsb of the VCL NAL unit differs from the ph_pic_order_cnt_lsb of the previous picture in decoding order.

Figure 9:
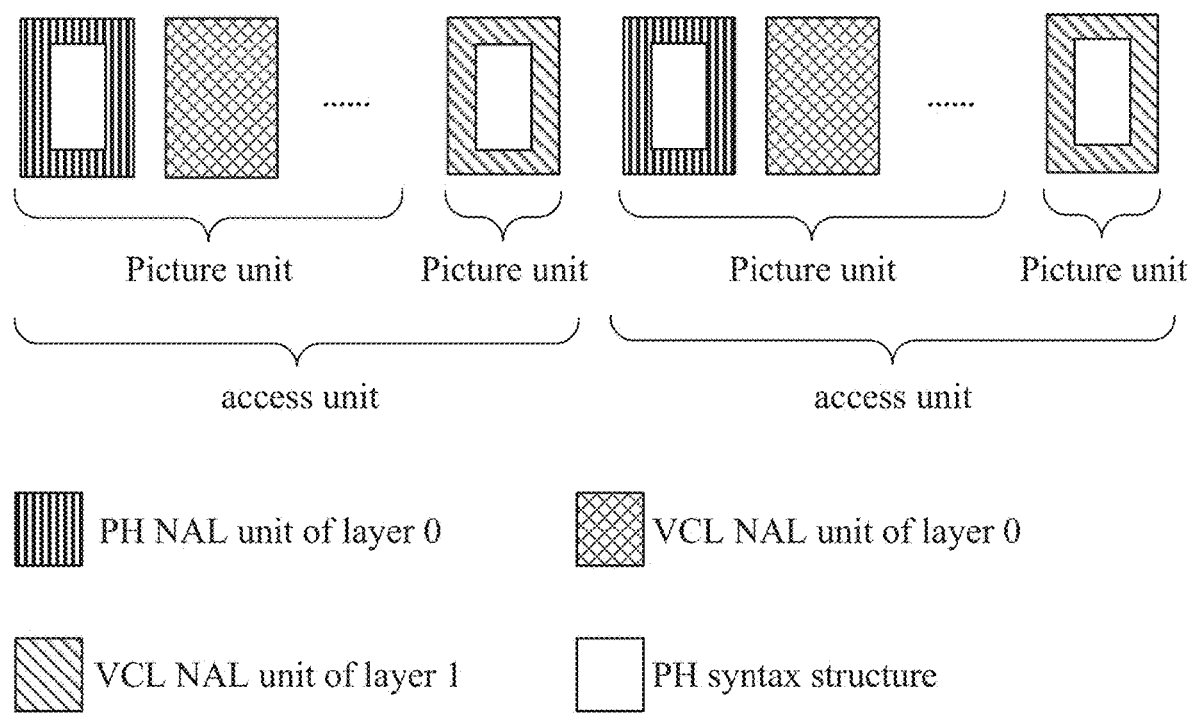
FIG. 9 illustrates exemplary presence of picture header syntax structures in coded video sequences (CVS), consistent with some embodiments of the present disclosure.

PicOrderCntVal derived for the VCL NAL unit differs from the PicOrderCntVal of the previous picture in decoding order As an example, FIG. 9 depicts the presence of picture header syntax structures in CVS with two layers. In layer 0, each picture unit consists of one or more VCL NAL units, and the PH syntax structure is signaled in PH NAL unit. In layer 1, each picture unit consists of only one VCL NAL unit, therefore, the PH syntax structure is signaled in a slice header in VCL NAL unit.

In VVC draft 8, weighted prediction parameters are signaled for each picture. The weighted prediction parameters can be signaled either in picture header (PH) syntax structure or in slice header but not in PH syntax structure. A flag (wp_info_in_ph_flag) is signaled in PPS to indicate it. When wp_info_in_ph_flag is equal to 0, the weighted prediction parameters are present in PH syntax structure and not present in slice headers referring to the PPS that do not contain a PH syntax structure. When wp_info_in_ph_flag is equal to 1, the weighted prediction parameters are not present in the PH syntax structure and could be present in slice headers referring to the PPS. A syntax element picture_header_in_slice_header_flag in slice header indicates if the PH syntax structure is signaled in slice header or in a separate PH NAL unit. As shown in FIG. 10, for Case 1 and Case 2, PH NAL unit is present and PH syntax structure is signaled in PH NAL unit; for Case 3 and Case 4, PH NAL unit is not present and PH syntax structure is signaled in Slice header. The values of picture_header_in_slice_header_flag and wp_info_in_ph_flag control where the weighted prediction parameters are signaled. There are totally 4 cases as shown in FIG. 10: in PH syntax structure in PH NAL unit (Case 1), in slice header without PH syntax structure (Case 2), in PH syntax structure signaled inside slice header (Case 3), or in slice header but out of PH syntax structure (Case 4).

The signaling of wp_info_in_ph_flag in PPS is shown in shown in FIG. 17.

wp_info_in_ph_flag equal to 1 specifies that weighted prediction information may be present in the PH syntax structure and not present in slice headers referring to the PPS that do not contain a PH syntax structure. wp_info_in_ph_flag equal to 0 specifies that weighted prediction information is not present in the PH syntax structure and may be present in slice headers referring to the PPS that do not contain a PH syntax structure. When not present, the value of wp_info_in_ph_flag is inferred to be equal to 0.

The signaling of pred_weight_table syntax structure in the picture header is shown in FIG. 18.

The signaling of picture_header_structure and pred_weight_table in the slice header is shown in FIG. 19.

The signaling of weighted prediction parameters is shown in FIG. 20.

luma_log2_weight_denom is the base 2 logarithm of the denominator for all luma weighting factors. The value of luma_log2_weight_denom shall be in the range of 0 to 7, inclusive.

delta_chroma_log2_weight_denom is the difference of the base 2 logarithm of the denominator for all chroma weighting factors. When delta_chroma_log2_weight_denom is not present, it is inferred to be equal to 0.

The variable ChromaLog2WeightDenom is derived to be equal to luma_log2_weight_denom+delta_chroma_log2_weight_denom and the value shall be in the range of 0 to 7, inclusive.

num_l0_weights specifies the number of weights signalled for entries in reference picture list 0 when wp_info_in_ph_flag is equal to 1. The value of num_l0_weights shall be in the range of 0 to num_ref_entries[0][RplsIdx[0]], inclusive.

If wp_info_in_ph_flag is equal to 1, the variable NumWeightsL0 is set equal to num_l0_weights. Otherwise (wp_info_in_ph_flag is equal to 0), NumWeightsL0 is set equal to NumRefIdxActive[0].

luma_weight_l0_flag[i] equal to 1 specifies that weighting factors for the luma component of list 0 prediction using RefPicList[0][i] are present. luma_weight_l0_flag[i] equal to 0 specifies that these weighting factors are not present.

chroma_weight_l0_flag[i] equal to 1 specifies that weighting factors for the chroma prediction values of list 0 prediction using RefPicList[0][i] are present. chroma_weight_l0_flag[i] equal to 0 specifies that these weighting factors are not present. When chroma_weight_l0_flag[i] is not present, it is inferred to be equal to 0.

delta_luma_weight_l0[i] is the difference of the weighting factor applied to the luma prediction value for list 0 prediction using RefPicList[0][i].

The variable LumaWeightL0[i] is derived to be equal to (1<<luma_log2_weight_denom)+delta_luma_weight_l0[i]. When luma_weight_l0_flag[i] is equal to 1, the value of delta_luma_weight_l0[i] shall be in the range of −128 to 127, inclusive. When luma_weight_l0_flag[i] is equal to 0, LumaWeightL0[i] is inferred to be equal to $2^{luma\_log2\_weight\_denom}$.

luma_offset_l0[i] is the additive offset applied to the luma prediction value for list 0 prediction using RefPicList[0][i]. The value of luma_offset_l0[i] shall be in the range of −128 to 127, inclusive. When luma_weight_l0_flag[i] is equal to 0, luma_offset_l0[i] is inferred to be equal to 0.

delta_chroma_weight_l0[i][j] is the difference of the weighting factor applied to the chroma prediction values for list 0 prediction using RefPicList[0][i] with j equal to 0 for Cb and j equal to 1 for Cr.

The variable ChromaWeightL0[i][j] is derived to be equal to (1<<ChromaLog2WeightDenom)+delta_chroma_weight_l0[i][j]. When chroma_weight_l0_flag[i] is equal to 1, the value of delta_chroma_weight_l0[i][j] shall be in the range of −128 to 127, inclusive. When chroma_weight_l0_flag[i] is equal to 0, ChromaWeightL0[i][j] is inferred to be equal to $2^{ChromaLog2WeightDenom}$.

delta_chroma_offset_l0[i][j] is the difference of the additive offset applied to the chroma prediction values for list 0 prediction using RefPicList[0][i] with j equal to 0 for Cb and j equal to 1 for Cr.

The variable ChromaOffsetL0[i][j] is derived as follows:

ChromaOffsetL0[i][j]=Clip3(−128,127,(128+delta_chroma_offset_l0[i][j]−((128*ChromaWeightL0[i][j])>>ChromaLog2WeightDenom)))

The value of delta_chroma_offset_l0[i][j] shall be in the range of −4*128 to 4*127, inclusive. When chroma_weight_l0_flag[i] is equal to 0, ChromaOffsetL0[i][j] is inferred to be equal to 0.

num_l1_weights specifies the number of weights signalled for entries in reference picture list 1 when wp_info_in_ph_flag is equal to 1. The value of num_l1_weights shall be in the range of 0 to num_ref_entries[1][RplsIdx[1]], inclusive.

If wp_info_in_ph_flag is equal to 1, the variable NumWeightsL1 is set equal to num_l1_weights. Otherwise (wp_info_in_ph_flag is equal to 0), NumWeightsL1 is set equal to NumRefIdxActive[1].

luma_weight_l1_flag[i], chroma_weight_l1_flag[i], delta_luma_weight_l1[i], luma_offset_l1[i], delta_chroma_weight_l1[i][j], and delta_chroma_offset_l1[i][j] have the same semantics as luma_weight_l0_flag[i], chroma_weight_l0_flag[i], delta_luma_weight_l0[i], luma_offset_l0[i], delta_chroma_weight_l0[i][j] and delta_chroma_offset_l0[i][j], respectively, with l0, L0, list 0 and List0 replaced by l1, L1, list 1 and List1, respectively.

The variable sumWeightL0Flags is derived to be equal to the sum of luma_weight_l0_flag[i]+2*chroma_weight_l0_flag[i], for i=0 . . . NumRefIdxActive[0]−1.

When slice_type is equal to B, the variable sumWeightL1Flags is derived to be equal to the sum of luma_weight_l1_flag[i]+2*chroma_weight_l1_flag[i], for i=0 . . . NumRefIdxActive[1]−1.

It is a requirement of bitstream conformance that, when slice_type is equal to P, sumWeightL0Flags shall be less than or equal to 24 and when slice_type is equal to B, the sum of sumWeightL0Flags and sumWeightL1Flags shall be less than or equal to 24.

In VVC draft 8, picture header structure can be signaled in a separate NAL unit (PH NAL unit) or in the slice header of a VCL NAL unit. When a coded picture has more than one slice, PH syntax structure is signaled in PH NAL unit immediately preceding the first VCL NAL unit of the PU. When a coded picture has only one slice, the PH syntax structure may be signaled in slice header without a PH NAL unit associated with the PU or signaled in a separate PH NAL unit.

There are the following problems in regard to the signaling of picture header in the VVC draft 8.

First, the definition of the first VCL NAL unit in an AU is incorrect. In VVC draft 8, A VCL NAL unit is the first VCL NAL unit of an AU (and consequently the PU containing the VCL NAL unit is the first PU of the AU) when the VCL NAL unit is the first VCL NAL unit that follows a PH NAL unit and one or more of the following conditions are true:

The value of nuh_layer_id of the VCL NAL unit is less than the nuh_layer_id of the previous picture in decoding order.

The value of ph_pic_order_cnt_lsb of the VCL NAL unit differs from the ph_pic_order_cnt_lsb of the previous picture in decoding order.

PicOrderCntVal derived for the VCL NAL unit differs from the PicOrderCntVal of the previous picture in decoding order.

The above definition works for the scenario where PH NAL unit is present. In the scenario where PH syntax structure is signaled in the slice header instead of as a separate NAL unit, the above definition is inaccurate.

Second, because the PH NAL may or may not be present in a PU, the first NAL unit of a PU cannot be detected by only checking the presence of PH NAL unit without parsing the slice header. For example, for two consecutive PUs in one layer, the first PU has a PH NAL unit followed by multiple VCL NAL units and the second PU only has one VCL NAL unit without PH preceding that VCL NAL unit. In decoder side, it will receive a PH NAL unit and then multiple VCL NAL units. So, the decoder is not able to know which VCL NAL is the first VCL NAL unit of the second PU unless it parses picture_header_in_slice_header_flag in slice header. (For the first PU, PH NAL unit present, so picture_header_in_slice_header_flag is equal to 0 and for the second PU, PH NAL unit is not present, so picture_header_in_slice_header_flag is equal to 1). Thus, in VVC draft 8, the detection the start of a PU needs to check the value of syntax element picture_header_in_slice_header_flag in slice header. It is a burden for the decoder to parse and check the syntax element in each slice header to determine whether the current slice belongs to a new picture or not.

Third, to signal whether picture header is signaled in slice header or in separate PH NAL, a flag in the beginning of the slice header is needed. Because the presence of PH NAL unit is required to be consistent throughout the CLVS, a set of constraints is imposed:

It is a requirement of bitstream conformance that the value of picture_header_in_slice_header_flag shall be the same in all coded slices in a CLVS.

When picture_header_in_slice_header_flag is equal to 1 for a coded slice, it is a requirement of bitstream conformance that no VCL NAL unit with nal_unit_type equal to PH_NUT shall be present in the CLVS.

When picture_header_in_slice_header_flag is equal to 0, all coded slices in the current picture shall have picture_header_in_slice_header_flag is equal to 0, and the current PU shall have a PH NAL unit.

In addition, the following two constraints are imposed to allow only one PH NAL unit for a picture in multiple slice scenario:

A PU consists of zero or one PH NAL unit, one coded picture, which comprises of one or more VCL NAL units, and zero or more other non-VCL NAL units.

When a picture consists of more than one VCL NAL unit, a PH NAL unit shall be present in the PU.

The above constraints add burden to the encoder for creating compliant bitstream.

Fourth, as described above, in VVC draft 8, the combination of syntax elements picture_header_in_slice_header_flag and wp_info_in_ph_flag controls where the weighted prediction parameters are signaled.

In Case 1 (see FIG. 10), pred_weight_table is signaled in PH NAL unit shared by the slices in the same coded picture. Since there may be mixed slice types in a coded picture, the weighted prediction parameters for list 1 may be needed.

In Cases 2, 3 and 4 (see FIG. 10), pred_weight_table is signaled in slice header for a single slice (i.e., the current slice). Since the slice type is known in some of the cases, when a slice is coded as a P slice, only the weighted prediction parameters for list 0 are needed. The signaling of the weighted prediction parameters for list 1 is unnecessary since they are only used in weighted bi-prediction, which may be allowed only for B slices.

However, in VVC draft 8, the weighted prediction parameters for reference list 1 may be always signaled following the weighted prediction parameters for reference list 0 in the pred_weight_table syntax structure, which creates syntax redundancy in some cases.

Moreover, when PH syntax structure is signaled in slice header (case 3 and case 4), there is no difference whether to signal weighted prediction parameters in PH syntax structure or out of PH syntax structure, as in both two cases the weighted prediction parameters are signaled in slice header. Therefore, there is redundancy between case 3 and case 4 with respect to signaling PH syntax structure.

The present disclosure provides solutions to solve the above problems.

According to some embodiments, a first method can be used to solve the first problem in regard to the signaling of picture header in the VVC draft 8. The definition of the first VCL NAL unit in an AU is incorrect, as the definition only works for the scenario where PH NAL unit is present. In the scenario where PH syntax structure is signaled in the slice header instead of as a separate NAL unit, the above definition is inaccurate.

Figure 11:
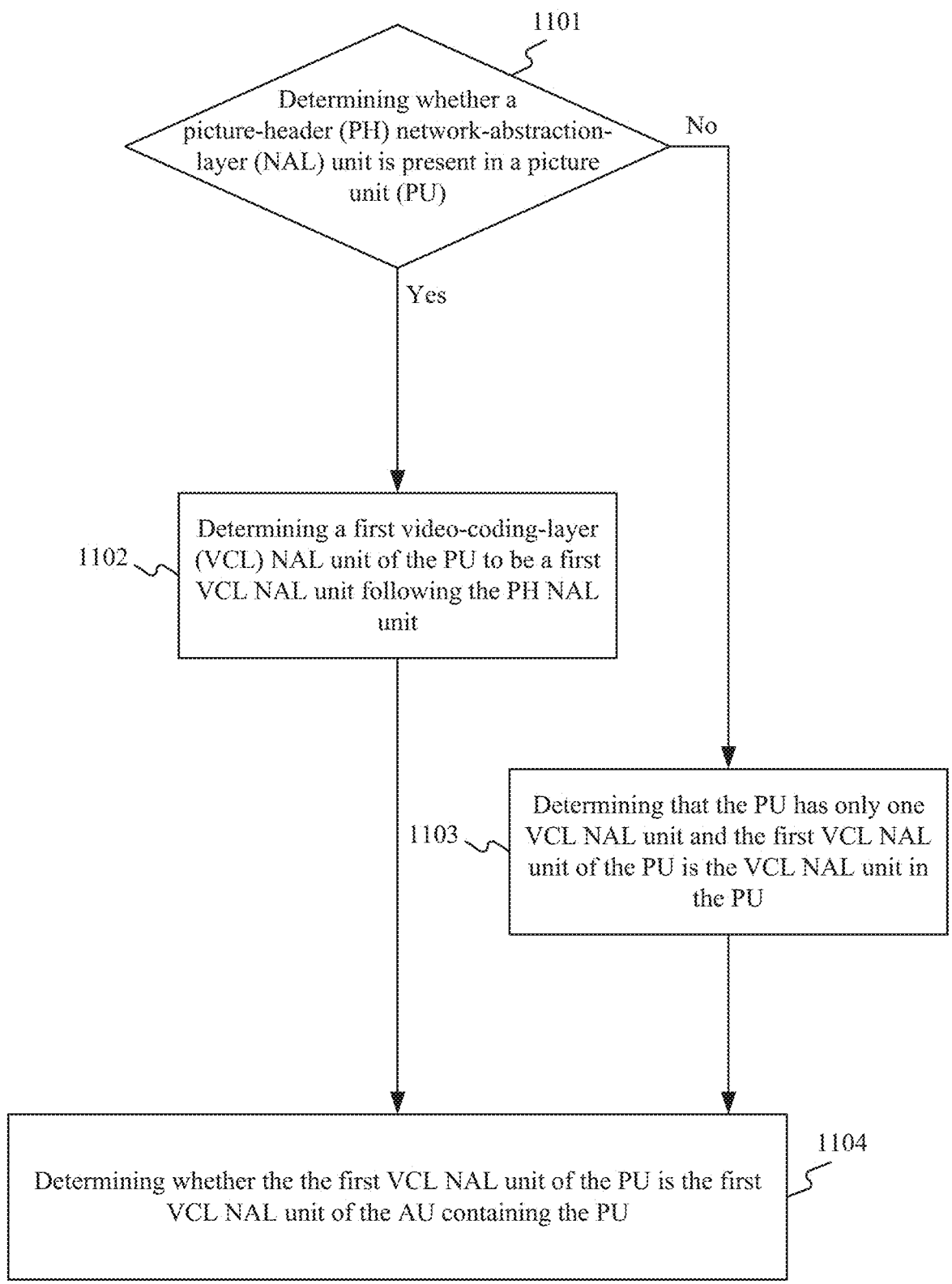
FIG. 11 is a flowchart of an exemplary computer-implemented method for processing video content, consistent with some embodiments of the present disclosure.

FIG. 11 is a flowchart of an exemplary computer-implemented method for processing video content, consistent with some embodiments of the present disclosure. The method can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform the method in FIG. 11. In some embodiments, the method can be implemented by a computer program product, embodied in a computer-readable medium, including computer-executable instructions, such as program code, executed by computers (e.g., apparatus 400 of FIG. 4). The method can include the following steps.

In step 1101, it is determined whether a picture-header (PH) network-abstraction-layer (NAL) unit is present in a picture unit (PU).

In step 1102, in response to the PH NAL unit being present in the PU, it is determined that a first video-coding-layer (VCL) NAL unit of the PU is a first VCL NAL unit following the PH NAL unit.

In step 1103, in response to the PH NAL unit being not present in the PU, it is determined that the PU has only one VCL NAL unit and the first VCL NAL unit of the PU is the VCL NAL unit in the PU.

In step 1104, it is determined whether the the first VCL NAL unit of the PU is the first VCL NAL unit of an access unit (AU) containing the PU.

In some embodiments, it is determined whether a value of a parameter of the first VCL NAL unit of the PU is different from a value of the parameter of a previous picture. In response to the value of the parameter of the first VCL NAL unit of the PU being different from the value of the parameter of the previous picture, it is determined that the first VCL NAL unit of the PU is a first VCL NAL unit of the AU containing the PU.

In some embodiments, the parameter comprises nuh_layer_id.

In some embodiments, the parameter comprises a POC variable. The POC variable can be ph_pic_order_cnt_lsb, or PicOrderCntVal.

The first VCL NAL unit of the PU is the first VCL NAL unit of an AU when one or more of the following conditions are true: 1) The value of nuh_layer_id of the VCL NAL unit is less than the nuh_layer_id of the previous picture in decoding order; 2) The value of ph_pic_order_cnt_lsb of the VCL NAL unit differs from the ph_pic_order_cnt_lsb of the previous picture in decoding order; and 3) PicOrderCntVal derived for the VCL NAL unit differs from the PicOrderCntVal of the previous picture in decoding order. It is proposed to modify the definition of the first VCL NAL unit in an AU as shown in FIG. 21.

Figure 12:
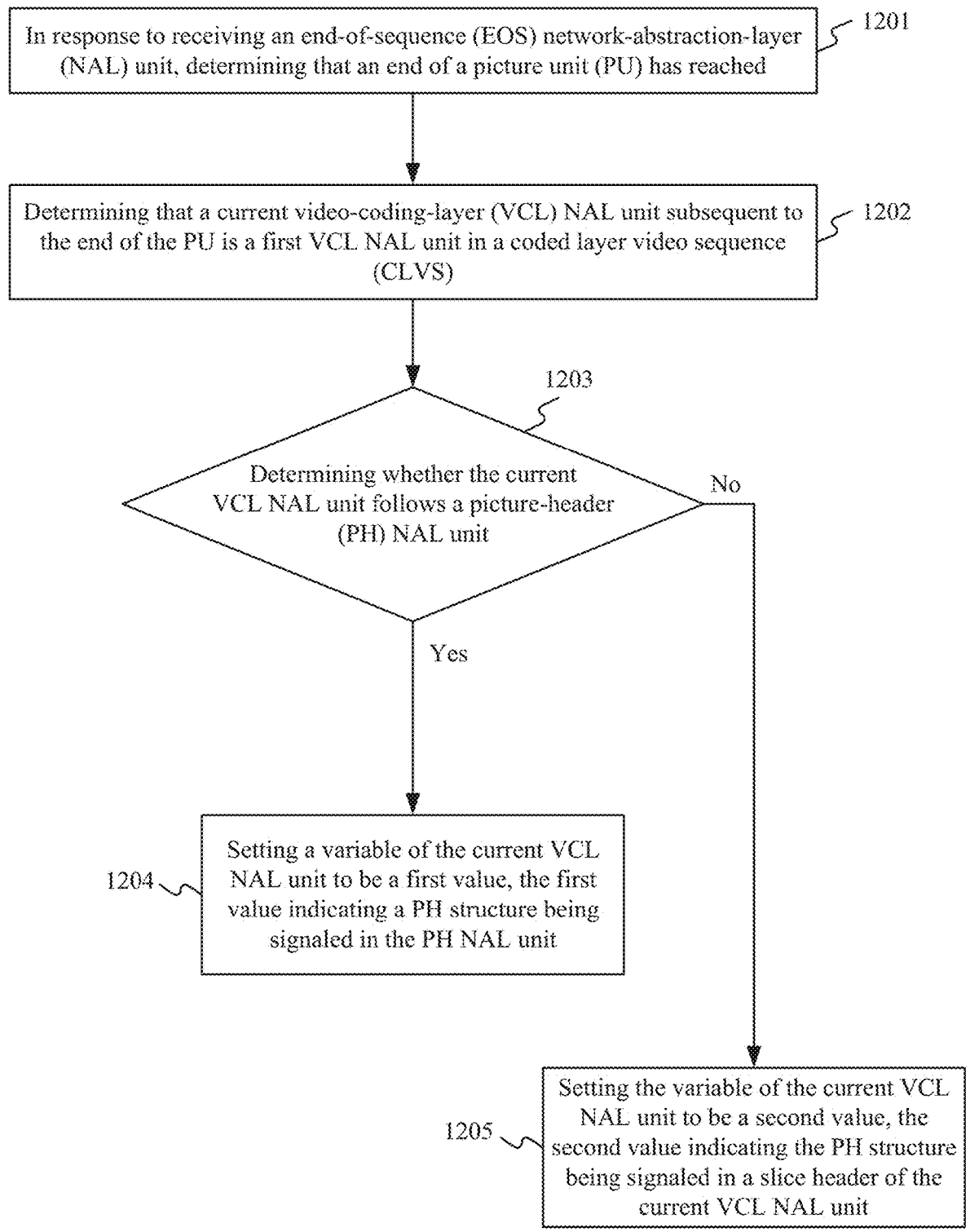
FIG. 12 is a flowchart of an exemplary computer-implemented method for processing video content, consistent with some embodiments of the present disclosure.

FIG. 12 is a flowchart of an exemplary computer-implemented method for processing video content is provided, consistent with some embodiments of the present disclosure. The method can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform the method in FIG. 12. In some embodiments, the method can be implemented by a computer program product, embodied in a computer-readable medium, including computer-executable instructions, such as program code, executed by computers (e.g., apparatus 400 of FIG. 4). The method can include the following steps.

According to some embodiments, a second method can be used to solve the second problem in regard to the signaling of picture header in the VVC draft 8. In VVC draft 8, the following constraint is imposed on the presence of PH NAL units, "it is a requirement of bitstream conformance that the value of picture_header_in_slice_header_flag shall be the same in all coded slices in a CLVS". Consequently, the above-described exemplary case where the first PU has PH NAL unit with multiple VCL NAL units and the second PU has only one VCL NAL unit without a PH NAL unit may only occur between two CLVS (i. e., the first PU is the last PU of a first CLVS and the second PU is the first PU of a second CLVS and there is no SPS and PPS NAL unit for the second CLVS). Thus, the above-described problem of detecting the first VCL NAL unit of a PU may only occur between two CLVS.

In step 1201, in response to receiving an end-of-sequence (EOS) network-abstraction-layer (NAL) unit, it is determined that an end of a picture unit (PU) has been reached.

It is proposed to mandate EOS NAL unit to identify the end of a CLVS to solve the problem in this solution. If EOS NAL unit is signaled at the end of a CLVS, for the above-mentioned case, decoder will receive an EOS NAL unit after the multiple VCL NAL units of the first PU and before the first VCL NAL unit of the second PU. When the decoder receives the EOS NAL unit, the decoder knows that it is the end of a CLVS and also the end of the first PU. So, the next VCL NAL unit is the first VCL NAL unit of the second PU. Slice level syntax element is not needed any more.

The following proposed changes can be made to the VVC specification or a similar specification as shown in FIG. 22 (underline showing additions and strikethroughs showing deletions).

According to some embodiments, a third method can be used to solve the second problem in regard to the signaling of picture header in the VVC draft 8. In VVC draft 8, the detection the start of a PU needs to check the value of syntax element picture_header_in_slice_header_flag in slice header. It is a burden for the decoder to parse and check the syntax element in each slice header to determine whether the current slice belong to a new picture or not. The third method is similar to the above-described second method, but further uses a variable to indicate the presence of PH syntax structure in slice header and remove syntax element picture_header_in_slice_header_flag to further reduce the (first three) encoder constraints imposed on slice header syntax element picture_header_in_slice_header_flag.

In some embodiments, the method further comprises steps 1202, 1203, 1204, and 1205.

In step 1202, in response to the end of the PU having been reached, it is determined that a current video-coding-layer (VCL) NAL unit subsequent to the end of the PU is a first VCL NAL unit in a coded layer video sequence (CLVS). As described above, when the decoder receives the EOS NAL unit, the decoder determines that it is the end of a CLVS and also the end of the first PU and determines the next VCL NAL unit is the first VCL NAL unit of the second PU.

In step 1203, whether the current VCL NAL unit follows a picture-header (PH) NAL unit is determined. If it is determined that the current VCL NAL unit follows the PH NAL unit, the method proceeds to step 1204. If it is determined that the current VCL NAL unit does not follow a PH NAL unit, the method proceeds to step 1205.

In step 1204, in response to the current VCL NAL unit following the PH NAL unit, a variable (e.g., PictureHeaderInSliceHeader) of the current VCL NAL unit is set to be a first value (e.g., 0), the first value indicates that a PH structure is signaled in the PH NAL unit.

In step 1205, in response to the current VCL NAL unit not following the PH NAL unit, the variable (e.g., PictureHeaderInSliceHeader) of the current VCL NAL unit is set to be a second value (e.g., 1), the second value indicates that the PH structure is signaled in a slice header of the current VCL NAL unit.

The syntax in VVC draft 8 is shown in FIG. 23.

In the proposed method, the syntax after change is shown in FIG. 24.

For example, the following proposed changes can be made to the VVC specification or a similar specification as shown in FIG. 25 (underline showing additions).

In the third method, the variable PictureHeaderInSliceHeader is initialized or reset for the first VCL NAL unit of a CLVS and for following VCL NAL units in the CLVS, the value of PictureHeaderInSliceHeader is kept the same. And the first VCL NAL unit can be easily detected using solution 2, which is either the first VCL NAL unit in the whole bitstream or the first VCL NAL unit after an EOS NAL unit.

According to some embodiments, a fourth method can be used to solve the third problem in regard to the signaling of picture header in the VVC draft 8. In the VVC draft 8, to signal whether picture header is signaled in slice header or in separate PH NAL, a flag in the beginning of the slice header is needed. In this regard, the constraints add burden to the encoder for creating compliant bitstream. Similar to the third method, it is proposed to replace signaling picture_header_in_slice_header_flag by a variable PictureHeaderInSliceHeader, which is derived by the presence of PH NAL unit in a PU to reduce the (first three) encoder constraints imposed on the slice header syntax element picture_header_in_slice_header_flag. The fourth method is different from the third method in the detection of the start of a PU.

Figure 13:
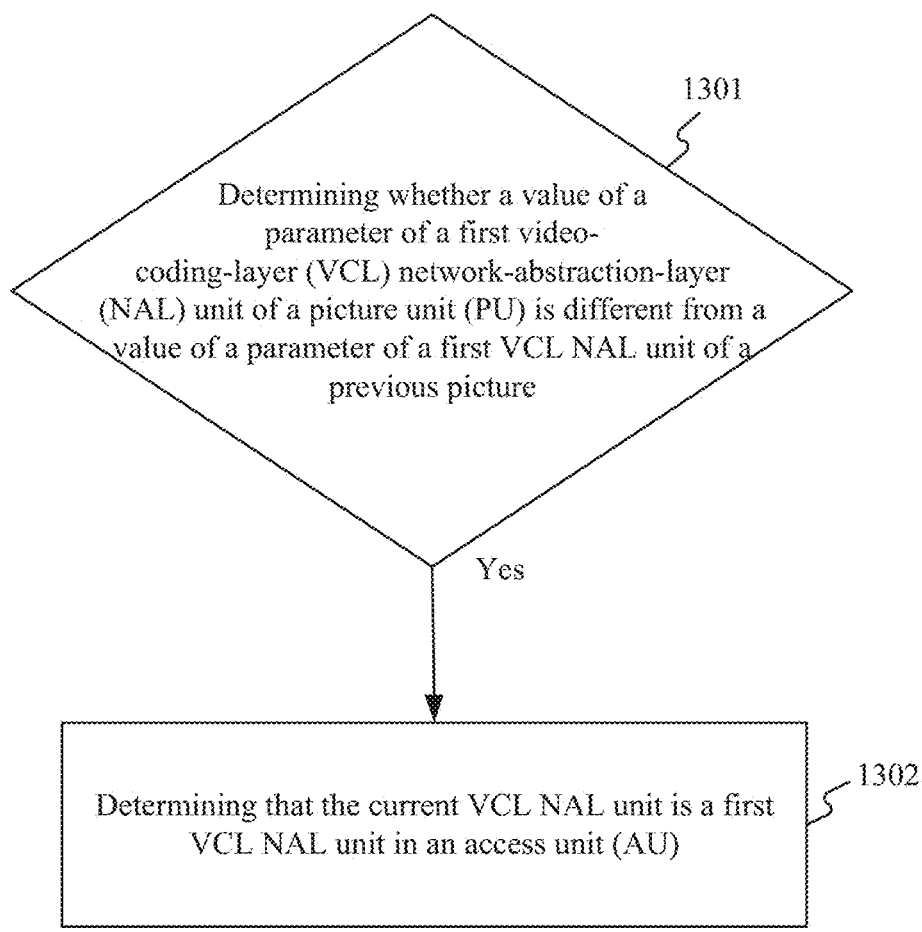
FIG. 13 is a flowchart of an exemplary computer-implemented method for processing video content, consistent with some embodiments of the present disclosure.

FIG. 13 is a flowchart of an exemplary computer-implemented method for processing video content is provided, consistent with some embodiments of the present disclosure. The method can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform the method in FIG. 13. In some embodiments, the method can be implemented by a computer program product, embodied in a computer-readable medium, including computer-executable instructions, such as program code, executed by computers (e.g., apparatus 400 of FIG. 4). The method can include the following steps.

In step 1301, it is determined whether a value of a parameter of a first video-coding-layer (VCL) network-abstraction-layer (NAL) unit of a picture unit (PU) is different from a value of the parameter of a first VCL NAL unit of a previous picture.

As described above, parsing of syntax element picture_header_in_slice_header_flag is performed for the detection of the first VCL NAL unit in a PU. When picture_header_in_slice_header_flag is removed as proposed, the first VCL NAL unit in a PU may be detected by checking the nuh_layer_id and a picture order count (POC) of the PU as described below. The picture order count is a variable that is associated with each picture, uniquely identifies the associated picture among all pictures in the CLVS.

The current VCL NAL unit is the first VCL NAL unit in a PU when any of the following conditions are true: 1) nuh_layer_id is different than that of the previous VCL NAL unit; and 2) ph_pic_order_cnt_lsb or PicOrderCntVal is different than that of the previous VCL NAL unit.

In some embodiments, the parameter comprises nuh_layer_id.

In some embodiments, the parameter comprises a POC variable. The POC variable can be ph_pic_order_cnt_lsb, or PicOrderCntVal.

In step 1302, in response to the value of the parameter of the first VCL NAL unit of the PU being different from the value of the parameter of the first VCL NAL unit of the previous picture, it is determined that the first VCL NAL unit is a first VCL NAL unit in an access unit (AU).

Therefore, when syntax element picture_header_in_slice_header_flag is removed as proposed, the detection of the first VCL NAL unit of a PU requires nuh_layer_id and POC related syntax elements, i.e., ph_pic_order_cnt_lsb, ph_poc_msb_present_flag, and poc_msb_val.

However, in the VVC draft 8, the syntax elements ph_pic_order_cnt_lsb, ph_poc_msb_present_flag and poc_msb_val are signaled in PH syntax structure and whether the presence of PH syntax structure in slice header or not requires the detection of the first VCL NAL unit in the proposed scheme. In some embodiments, signalling the POC related syntax elements, i.e. ph_pic_order_cnt_lsb, ph_poc_msb_present_flag and poc_msb_val, in slice header before the PH syntax structure can also be performed if any present instead of signaling in picture header as current VVC draft 8.

In some embodiments, the POC variable (e.g., ph_pic_order_cnt_lsb, ph_poc_msb_present_flag and poc_msb_val) is signaled in a slice header.

The changes to the syntax are shown in FIG. 26.

In the proposed method, A VCL NAL unit is the first VCL NAL unit in a PU when any of the following conditions are true: 1) nuh_layer_id is different than that of the previous VCL NAL unit; or 2) ph_pic_order_cnt_lsb or PicOrderCntVal is different than that of the previous VCL NAL unit.

For example, the following proposed changes can be made to the VVC specification or a similar specification as shown in FIG. 27 (underline showing additions and strikethroughs showing deletions).

Unlike the third method, the fourth method is not based on the second method. Thus, POC related syntax elements are needed to check the first VCL NAL unit of a PU. However, the fourth method can also be combined with the second method in which EOS NAL unit is mandatory. In that case, POC related syntax elements are not needed. Thus, if combined with the second method, the change of the fourth method is to replace picture_header_in_slice_header_flag by a variable derived by the presence of PH NAL unit.

According to some embodiments, a fifth method can be used to solve the third problem in regard to the signaling of picture header in the VVC draft 8. In the VVC draft 8, to signal whether picture header is signaled in slice header or in separate PH NAL, a flag in the beginning of the slice header is needed. In this regard, the constraints add burden to the encoder for creating compliant bitstream. Similar to the fourth method, the fifth method proposes to replace signaling syntax element picture_header_in_slice_header_flag with a variable to indicate the presence of PH syntax structure in slice header.

The difference between the fourth and fifth methods is that the fourth method uses POC related syntax elements to detect the first VCL NAL unit in a PU while the fifth method proposes to detect the first VCL NAL unit in a PU based on syntax element num_slices_in_pic_minus1 signaled in PPS. In the fifth method, the number of VCL NAL units which is equal to the number of slices in a PU is tracked. When the VCL NAL units present in a PU reaches (num_slices_in_pic_minus1+1), the next VCL NAL unit starts a new PU.

However, in the VVC draft 8, num_slices_in_pic_minus1 is signaled in PPS and PPS ID is signaled in PH syntax structure, and the presence of PH syntax structure in slice header needs to know to detect the first VCL NAL unit in the proposed scheme. To break the chicken and egg dilemma, it is also proposed to signal the PPS ID, i.e. slice_pic_parameter_set_id, in SH before the PH syntax structure if any present and conditionally signal PPS ID i.e. ph_pic_parameter_set_id, in PH on PictureHeaderInSliceHeader.

The syntax changes are shown in FIG. 28.

For example, the following proposed changes can be made to the VVC specification or a similar specification as shown in FIG. 29 (underline showing additions and strikethroughs showing deletions).

Unlike the third method, the fifth method is not based on the second method. Thus, the number of slices in a picture is used to check the first VCL NAL unit of a PU. However, the fifth method can also be combined with solution 2 in which EOS NAL unit is mandatory. In that case, the number of slices is not needed. Thus, if combined with second method, the change of the fifth method is to replace picture_header_in_slice_header_flag by a variable derived by the presence of PH NAL unit.

According to some embodiments, a sixth method can be used to solve the third problem in regard to the signaling of picture header in the VVC draft 8. In the VVC draft 8, to signal whether the picture header is signaled in slice header or in separate PH NAL, a flag in the beginning of the slice header is needed. In this regard, the constraints add burden to the encoder for creating compliant bitstream. According to the sixth method, it is proposed to signal PH syntax structure in the first slice of a picture, so that picture_header_in_slice_header_flag is not needed any more, and thus the constraints can be reduced. By doing this, it is requested to know the first slice of a picture. Thus, it is also proposed to signal a flag in slice to indicate whether the slice is the first slice of a coded picture.

The syntax changes are shown in FIG. 30.

In some embodiments, the following constraints can be changed as shown in FIG. 31 (underline showing additions and strikethroughs showing deletions).

The sixth method has the following benefits. First, the sixth method saves one NAL unit type. The length of nal_unit_type signaled in NAL header is 5-bit. Therefore, maximum number of nal_unit_type is only 32. Currently, there are only two reserved NAL unit types for non-VCL NAL unit and 4 unspecified NAL unit types. The NAL unit type is a precious resource for the future extension. Second, the sixth method reduces the number of constraints and consequently reduce the encoder burden of creating compliant bitstream. Third, the sixth method reduces the number of bits to signal the picture header in multiple slice in a picture scenario. When picture header is signaled in a separate NAL unit, there are extra cost including the NAL unit header and trailing_rbsp_bits. By getting rid of PH NAL unit, those extra bits are saved.

According to some embodiments, a seventh method can be used to solve the third problem in regard to the signaling of picture header in the VVC draft 8. In the VVC draft 8, to signal whether picture header is signaled in slice header or in separate PH NAL, a flag in the beginning of the slice header is needed. In this regard, the constraints add burden to the encoder for creating compliant bitstream. There are two main points of constraints in VVC draft 8: 1) picture_header_in_slice_header_flag shall be the same in all coded slices in a CLVS and 2) When a picture consists of more than one VCL NAL unit, a PH NAL unit shall be present in the PU. Thus, in a first example of this solution, it is proposed to signal a flag to indicate there is only one slice per picture and a flag to indicate the presence of PH NAL unit in SPS. And the second flag is conditionally signaled on the first flag.

The syntax changes consistent with the seventh method is shown in FIG. 32.

For example, the following proposed changes can be made to the VVC specification or a similar specification as shown in FIG. 33 (underline showing additions and strike-throughs showing deletions).

By signaling these two flags, the constraints in the VVC draft 8 can be reduced. Additional changes to the VVC specification or a similar specification such as the following two new constraints can be added as shown in FIG. 34 (underline showing additions).

In a second example of the seventh method, it is proposed only add one flag which indicates only one slice per picture and impose a constraint on the value of picture_header_in_slice_header and this newly added flag.

The syntax changes of this example are shown in FIG. 35.

For example, the following proposed changes can be made to the VVC specification or a similar specification shown in FIG. 36 (underline showing additions and strike-throughs showing deletions).

Please note that the semantics of sps_single_slice_per_picture in the second example is a little different from that in the first example. The difference is that in the first example sps_single_slice_per_picture being 0 means there is a least one picture containing more than one slice while in the second example sps_single_slice_per_picture being 0 means no restriction on the number of slice in a picture.

By signaling this new flag, the constraints in the VVC draft 8 or similar specification can be reduced.

For example, the following proposed changes can be made to the VVC specification or a similar specification as shown in FIG. 37 (underline showing additions and strike-throughs showing deletions).

Moreover, there is an additional benefit for this solution (applicable to both examples). By adding sps_single_slice_per_picture flag, the signaling of subpicture number may be skipped, since there cannot be multiple subpictures within a picture containing a single slice. The syntax changes are shown in FIG. 38.

According to some embodiments, an eighth method can be used to solve the fourth problem in regard to the signaling of picture header in the VVC draft 8. In the VVC draft 8, the combination of syntax elements picture_header_in_slice_header_flag and wp_info_in_ph_flag controls where the weighted prediction parameters are signaled.

In Case 1 (see FIG. 10), pred_weight_table is signaled in PH syntax structure and PH syntax structure is signaled in a PH NAL unit which is shared by the slices in the same coded picture. Since there may be mixed slice types in a coded picture, the weighted prediction parameters for list 1 may be needed.

In Cases 2, 3 and 4 (see FIG. 10), pred_weight_table is signaled in slice header for a single slice (i.e., the current slice). Since the slice type is known in some of the cases, when a slice is coded as a P slice, only the weighted prediction parameters for list 0 are needed. The signaling of the weighted prediction parameters for list 1 is unnecessary since they are only used in weighted bi-prediction which is allowed only for B slices.

However, in VVC draft 8, the weighted prediction parameters for reference list 1 are signaled following the weighted prediction parameters for reference list 0 in the pred_weight_ table syntax structure, which creates syntax redundancy in some cases.

As described above, for Cases 2, 3, and 4, if the slice is coded as a P slice, the weighted prediction parameters for reference list 1 are not needed to be signaled. It can be improved by conditionally signal the weighted prediction parameters for reference list 1 in the slice header when (e.g., only when) the slice type is B slice. However, the slice_type is signaled in slice header after PH syntax structure. Therefore, in case 3, the slice_type is unknown when parsing wp_pred_table. In some embodiments, it is proposed to signal wp_pred_table in slice header and not as part of the picture header syntax structure when picture_header_in_slice_header_flag==1. This will merge the case 3 and case 4 into the same case in terms of weighted prediction parameter signaling.

Figure 14:
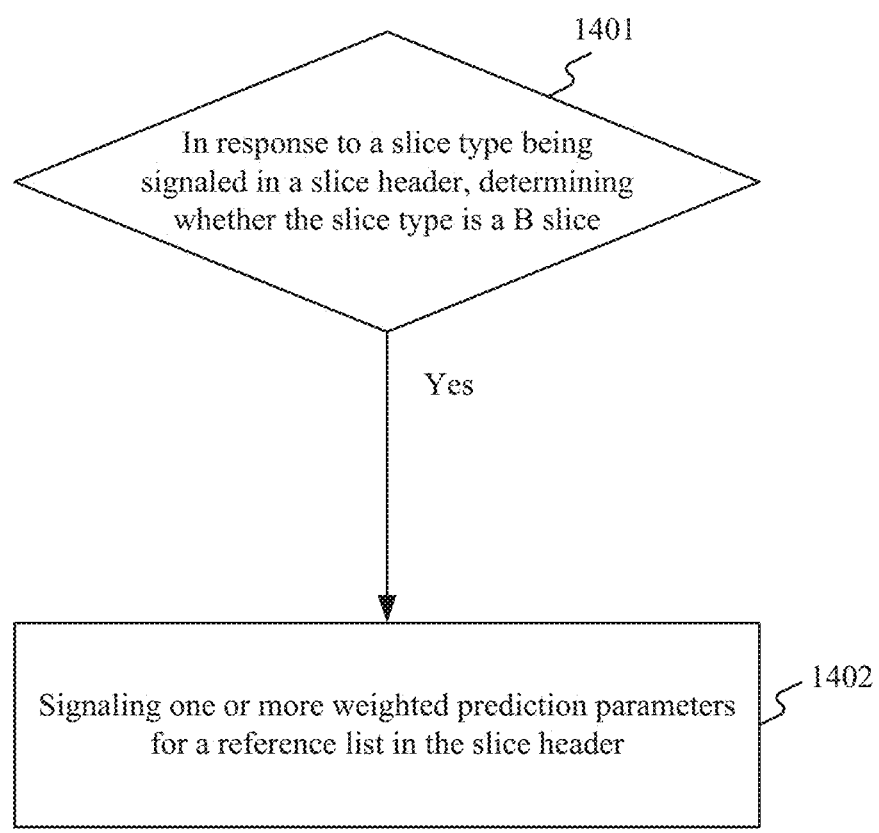
FIG. 14 is a flowchart of an exemplary computer-implemented method for processing video content, consistent with some embodiments of the present disclosure.

FIG. 14 is a flowchart of an exemplary computer-implemented method for processing video content is provided, consistent with some embodiments of the present disclosure. The method can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform the method in FIG. 14. In some embodiments, the method can be implemented by a computer program product, embodied in a computer-readable medium, including computer-executable instructions, such as program code, executed by computers (e.g., apparatus 400 of FIG. 4). The method can include the following steps.

In step 1401, in response to a slice type being signaled in a slice header, it is determined whether the slice type is a B slice. If the slice type is the B slice, the method proceeds to step 1402.

In step 1402, in response to the slice type being the B slice, one or more weighted prediction parameters are signaled for a reference list (e.g., list 1) in the slice header. The weighted prediction parameters are conditionally signaled for reference list 1 in the slice header.

The syntax changes are shown in FIG. 39.

For example, the following proposed changes can be made to the VVC specification or a similar specification as shown in FIG. 40 (underline showing additions and strikethroughs showing deletions).

In some embodiments consistent with the eighth method, it is proposed to signal the pred_weight_table syntax structure in the slice header but not as part of PH syntax structure. The changes are shown as shown in FIG. 41.

For example, the following proposed changes can be made to the VVC specification or a similar specification as shown in FIG. 42 (underline showing additions and strikethroughs showing deletions).

For example, the following proposed changes can be made to the VVC specification or a similar specification as shown in FIG. 43 (underline showing additions and strikethroughs showing deletions).

Figure 15:
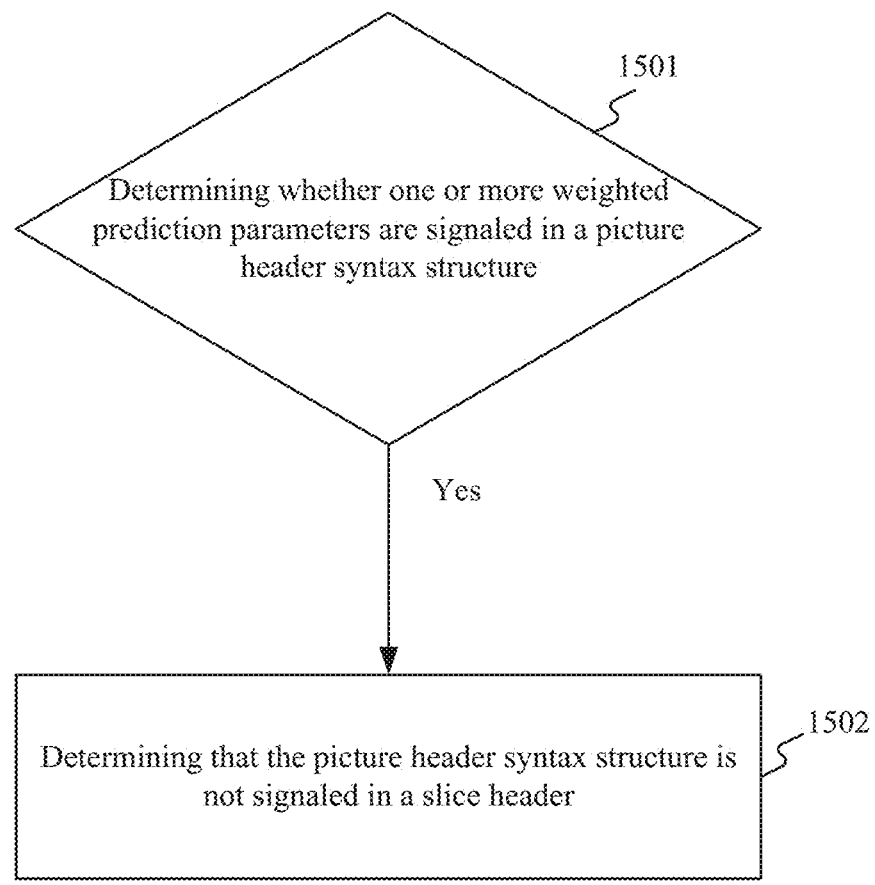
FIG. 15 is a flowchart of an exemplary computer-implemented method for processing video content is provided, consistent with some embodiments of the present disclosure.

FIG. 15 is a flowchart of an exemplary computer-implemented method for processing video content is provided, consistent with some embodiments of the present disclosure. The method can be performed by a decoder (e.g., by process 300A of FIG. 3A or 300B of FIG. 3B) or performed by one or more software or hardware components of an apparatus (e.g., apparatus 400 of FIG. 4). For example, a processor (e.g., processor 402 of FIG. 4) can perform the method in FIG. 15. In some embodiments, the method can be implemented by a computer program product, embodied in a computer-readable medium, including computer-executable instructions, such as program code, executed by computers (e.g., apparatus 400 of FIG. 4). The method can include the following steps.

In step 1501, it is determined whether one or more weighted prediction parameters are signaled in a picture header syntax structure.

In some embodiments, step 1501 includes receiving a first flag from a bitstream and determining whether the one or more weighted prediction parameters are signaled in the picture header syntax structure according to a value of the first flag.

In some embodiments, the first flag is present in a Picture Parameter Set (PPS).

In step 1502, in response to the one or more weighted prediction parameters having been signaled in the picture header syntax structure, it is determined that the picture header syntax structure is not signaled in a slice header.

The method can further include in response to the one or more weighted prediction parameters having been signaled in the picture header syntax structure, determining that picture header syntax structure is signaled in a PH NAL unit.

As described before, there is redundancy between Case 3 and Case 4 with respect to signaling PH syntax structure. That is, when the PH syntax structure is signaled in slice header, the pred_weight_table syntax structure can be signaled in PH syntax structure in slice header or in slice header but out of PH syntax structure. Therefore, in both Case 3 and Case 4, the pred_weight_table syntax structure is signaled in slice level. To remove the redundancy, in some embodiments, it is proposed to disallow Case 3. That is, when PH syntax structure is signaled in slice header, the pred_weight_table_sytnax structure can only be signaled in slice header but out of PH syntax structure. When pred_weight_table syntax structure is signaled in PH syntax structure, PH syntax structure cannot be signaled in slice header (PH syntax structure have to be present in a separated PH NAL unit). The constraint shown in FIG. 44 can be added to the semantics.

It is appreciated that the above embodiments can be combined during implementation.

The disclosed embodiments may further be described using the following clauses:

1. A computer-implemented method for processing video content, comprising:
   determining whether a picture-header (PH) network-abstraction-layer (NAL) unit is present in a picture unit (PU);
   in response to the PH NAL unit being present in the PU, determining a first video-coding-layer (VCL) NAL unit of the PU to be a first VCL NAL unit following the PH NAL unit, or
   in response to the PH NAL unit being not present in the PU, determining that the PU has only one VCL NAL unit and the first VCL NAL unit of the PU is the VCL NAL unit in the PU; and
   determining whether the first VCL NAL unit of the PU is the first VCL NAL unit of an access unit (AU) containing the PU.

2. The method of clause 1, wherein determining whether the first VCL NAL unit of the PU is the first VCL NAL unit of the AU containing the PU comprises:
   determining whether a value of a parameter of the first VCL NAL unit is different from a value of a parameter of a previous picture; and
   in response to the value of the parameter of the first VCL NAL unit being different from the value of the parameter of the previous picture, determining that the first VCL NAL unit is the first VCL NAL unit of the AU containing the PU.

3. The method of clause 2, wherein the parameter comprises a layer identifier, determining whether the value of the parameter of the first VCL NAL unit is different from the value of the parameter of the previous picture comprises:
   determining whether the value of the layer identifier of the first VCL NAL unit of the PU is different from the value of the layer identifier of the previous picture.

4. The method of clause 2, wherein the parameter comprises a picture order count (POC) variable and determining whether the value of the parameter of the first VCL NAL unit of the PU is different from the value of the parameter of the previous picture comprises:
   determining whether the value of the POC variable of the first VCL NAL unit of the PU is different from the value of the POC variable of the previous picture.

5. A computer-implemented method for processing video content, comprising:
   determining whether a value of a parameter of a first video-coding-layer (VCL) network-abstraction-layer (NAL) unit of a picture unit (PU) is different from a value of a parameter of a previous picture; and
   in response to the value of the parameter of the first VCL NAL unit of the PU being different from the value of the parameter of the previous picture, determining that the first VCL NAL unit is a first VCL NAL unit in an access unit (AU).

6. The method of clause 5, wherein the parameter comprises a layer identifier, determining whether the value of the parameter of the first VCL NAL unit of the PU is different from the value of the parameter of the previous picture comprises:

determining whether the value of the layer identifier of the first VCL NAL unit of the PU is different from the value of the layer identifier of the previous picture.

7. The method of clause 5, wherein the parameter comprises a picture order count (POC) variable and determining whether the value of the parameter of the first VCL NAL unit of the PU is different from the value of the parameter of the previous picture comprises:
determining whether the value of the POC variable of the first VCL NAL unit of the PU is different from the value of the POC variable of the previous picture.

8. The method of clause 7, wherein the POC variable is signaled in a slice header.

9. A computer-implemented method for processing video content, comprising:
determining whether one or more weighted prediction parameters are signaled in a picture header syntax structure; and
in response to the one or more weighted prediction parameters having been signaled in the picture header syntax structure, determining that the picture header syntax structure is not signaled in a slice header.

10. The method of clause 9, wherein determining whether the one or more weighted prediction parameters are signaled in the picture header syntax structure comprises:
receiving a first flag from a bitstream; and
determining whether the one or more weighted prediction parameters are signaled in the picture header syntax structure according to a value of the first flag.

11. The method of clause 10, wherein the first flag is present in a Picture Parameter Set (PPS).

12. The method of clause 9, further comprising:
in response to the one or more weighted prediction parameters having been signaled in the picture header syntax structure, determining that picture header syntax structure is signaled in a PH NAL unit.

13. A computer-implemented method for processing video content, comprising:
in response to a slice type being signaled in a slice header, determining whether the slice type is a B slice; and
in response to the slice type being the B slice, signaling one or more weighted prediction parameters for a reference list in the slice header.

14. A computer-implemented method for processing video content, comprising:
in response to receiving an end-of-sequence (EOS) network-abstraction-layer (NAL) unit, determining that an end of a picture unit (PU) has been reached.

15. The method of clause 14, further comprising:
in response to the end of the PU having been reached, determining that a current video-coding-layer (VCL) NAL unit subsequent to the end of the PU is a first VCL NAL unit in a coded layer video sequence (CLVS);
determining whether the current VCL NAL unit follows a picture-header (PH) NAL unit; and
in response to the current VCL NAL unit following the PH NAL unit, setting a variable of the current VCL NAL unit to be a first value, the first value indicating a PH structure being signaled in the PH NAL unit, or
in response to the current VCL NAL unit not following the PH NAL unit, setting the variable of the current VCL NAL unit to be a second value, the second value indicating the PH structure being signaled in a slice header of the current VCL NAL unit.

16. The method of clause 15, further comprising:
setting the variable of a subsequent VCL NAL unit after the current VCL NAL unit to be the value of the variable of the current VCL NAL unit.

17. An apparatus for processing video content, comprising:
a memory storing a set of instructions; and one or more processors configured to execute the set of instructions to cause the apparatus to perform:
determining whether a picture-header (PH) network-abstraction-layer (NAL) unit is present in a picture unit (PU);
in response to the PH NAL unit being present in the PU, determining a first video-coding-layer (VCL) NAL unit of the PU to be a first VCL NAL unit following the PH NAL unit, or
in response to the PH NAL unit being not present in the PU, determining that the PU has only one VCL NAL unit and the first VCL NAL unit of the PU is the VCL NAL unit in the PU; and
determining whether the first VCL NAL unit of the PU is the first VCL NAL unit of an access unit (AU) containing the PU.

18. The apparatus to clause 17, wherein determining whether the first VCL NAL unit of the PU is the first VCL NAL unit of the AU containing the PU comprises:
determining whether a value of a parameter of the first VCL NAL unit is different from a value of a parameter of a previous picture; and
in response to the value of the parameter of the first VCL NAL unit being different from the value of the parameter of the previous picture, determining that the first VCL NAL unit is the first VCL NAL unit of the AU containing the PU.

19. The apparatus to clause 18, wherein the parameter comprises a layer identifier, determining whether the value of the parameter of the first VCL NAL unit is different from the value of the parameter of the previous picture comprises:
determining whether the value of the layer identifier of the first VCL NAL unit of the PU is different from the value of the layer identifier of the previous picture.

20. The apparatus to clause 18, wherein the parameter comprises a picture order count (POC) variable and determining whether the value of the parameter of the first VCL NAL unit of the PU is different from the value of the parameter of the previous picture comprises:
determining whether the value of the POC variable of the first VCL NAL unit of the PU is different from the value of the POC variable of the previous picture.

21. An apparatus for processing video content, comprising:
a memory storing a set of instructions; and
one or more processors configured to execute the set of instructions to cause the apparatus to perform:
determining whether a value of a parameter of a first video-coding-layer (VCL) network-abstraction-layer (NAL) unit of a picture unit (PU) is different from a value of a parameter of a previous picture; and
in response to the value of the parameter of the first VCL NAL unit of the PU being different from the value of the parameter of the previous picture, determining that the first VCL NAL unit is a first VCL NAL unit in an access unit (AU).

22. The apparatus of clause 21, wherein the parameter comprises a layer identifier, determining whether the value of the parameter of the first VCL NAL unit of the PU is different from the value of the parameter of the previous picture comprises:

determining whether the value of the layer identifier of the first VCL NAL unit of the PU is different from the value of the layer identifier of the previous picture.

23. The apparatus of clause 21, wherein the parameter comprises a picture order count (POC) variable and determining whether the value of the parameter of the first VCL NAL unit of the PU is different from the value of the parameter of the previous picture comprises:

determining whether the value of the POC variable of the first VCL NAL unit of the PU is different from the value of the POC variable of the previous picture.

24. The apparatus of clause 23, wherein the POC variable is signaled in a slice header.

25. An apparatus for processing video content, comprising:

a memory storing a set of instructions; and one or more processors configured to execute the set of instructions to cause the apparatus to perform:

determining whether one or more weighted prediction parameters are signaled in a picture header syntax structure; and in response to the one or more weighted prediction parameters having been signaled in the picture header syntax structure, determining that the picture header syntax structure is not signaled in a slice header.

26. The apparatus of clause 25, wherein determining whether the one or more weighted prediction parameters are signaled in the picture header syntax structure comprises:

receiving a first flag from a bitstream; and determining whether the one or more weighted prediction parameters are signaled in the picture header syntax structure according to a value of the first flag.

27. The apparatus of clause 26, wherein the first flag is present in a Picture Parameter Set (PPS).

28. The apparatus of clause 25, wherein the one or more processors configured to execute the set of instructions to cause the apparatus to further perform:

in response to the one or more weighted prediction parameters having been signaled in the picture header syntax structure, determining that picture header syntax structure is signaled in a PH NAL unit.

29. An apparatus for processing video content, comprising:

a memory storing a set of instructions; and one or more processors configured to execute the set of instructions to cause the apparatus to perform:

in response to a slice type being signaled in a slice header, determining whether the slice type is a B slice; and in response to the slice type being the B slice, signaling one or more weighted prediction parameters for a reference list in the slice header.

30. An apparatus for processing video content, comprising:

a memory storing a set of instructions; and one or more processors configured to execute the set of instructions to cause the apparatus to perform:

in response to receiving an end-of-sequence (EOS) network-abstraction-layer (NAL) unit, determining that an end of a picture unit (PU) has been reached.

31. The apparatus of clause 30, wherein the one or more processors configured to execute the set of instructions to cause the apparatus to further perform:

in response to the end of the PU having been reached, determining that a current video-coding-layer (VCL) NAL unit subsequent to the end of the PU is a first VCL NAL unit in a coded layer video sequence (CLVS);

determining whether the current VCL NAL unit follows a picture-header (PH) NAL unit; and in response to the current VCL NAL unit following the PH NAL unit, setting a variable of the current VCL NAL unit to be a first value, the first value indicating a PH structure being signaled in the PH NAL unit, or in response to the current VCL NAL unit not following the PH NAL unit, setting the variable of the current VCL NAL unit to be a second value, the second value indicating the PH structure being signaled in a slice header of the current VCL NAL unit.

32. The apparatus of clause 31, wherein the one or more processors configured to execute the set of instructions to cause the apparatus to further perform:

setting the variable of a subsequent VCL NAL unit after the current VCL NAL unit to be the value of the variable of the current VCL NAL unit.

33. A non-transitory computer readable medium that stores a set of instructions that is executable by at least one processor of a computer to cause the computer to perform a method for processing video content, the method comprising:

determining whether a picture-header (PH) network-abstraction-layer (NAL) unit is present in a picture unit (PU);

in response to the PH NAL unit being present in the PU, determining a first video-coding-layer (VCL) NAL unit of the PU to be a first VCL NAL unit following the PH NAL unit, or in response to the PH NAL unit being not present in the PU, determining that the PU has only one VCL NAL unit and the first VCL NAL unit of the PU is the VCL NAL unit in the PU; and determining whether the first VCL NAL unit of the PU is the first VCL NAL unit of an access unit (AU) containing the PU.

34. The non-transitory computer readable medium of clause 33, wherein determining whether the first VCL NAL unit of the PU is the first VCL NAL unit of the AU containing the PU comprises:

determining whether a value of a parameter of the first VCL NAL unit is different from a value of a parameter of a previous picture; and in response to the value of the parameter of the first VCL NAL unit being different from the value of the parameter of the previous picture, determining that the first VCL NAL unit is the first VCL NAL unit of the AU containing the PU.

35. The non-transitory computer readable medium of clause 34, wherein the parameter comprises a layer identifier, determining whether the value of the parameter of the first VCL NAL unit is different from the value of the parameter of the previous picture comprises:

determining whether the value of the layer identifier of the first VCL NAL unit of the PU is different from the value of the layer identifier of the previous picture.

36. The non-transitory computer readable medium of clause 34, wherein the parameter comprises a picture order count (POC) variable and determining whether the value of the parameter of the first VCL NAL unit of the PU is different from the value of the parameter of the previous picture comprises:

determining whether the value of the POC variable of the first VCL NAL unit of the PU is different from the value of the POC variable of the previous picture.

37. A non-transitory computer readable medium that stores a set of instructions that is executable by at least one processor of a computer to cause the computer to perform a method for processing video content, the method comprising:
determining whether a value of a parameter of a first video-coding-layer (VCL) network-abstraction-layer (NAL) unit of a picture unit (PU) is different from a value of a parameter of a previous picture; and
in response to the value of the parameter of the first VCL NAL unit of the PU being different from the value of the parameter of the previous picture, determining that the first VCL NAL unit is a first VCL NAL unit in an access unit (AU).

38. The non-transitory computer readable medium of clause 37, wherein the parameter comprises a layer identifier, determining whether the value of the parameter of the first VCL NAL unit of the PU is different from the value of the parameter of the previous picture comprises:
determining whether the value of the layer identifier of the first VCL NAL unit of the PU is different from the value of the layer identifier of the previous picture.

39. The non-transitory computer readable medium of clause 37, wherein the parameter comprises a picture order count (POC) variable and determining whether the value of the parameter of the first VCL NAL unit of the PU is different from the value of the parameter of the previous picture comprises:
determining whether the value of the POC variable of the first VCL NAL unit of the PU is different from the value of the POC variable of the previous picture.

40. The non-transitory computer readable medium of clause 39, wherein the POC variable is signaled in a slice header.

41. A non-transitory computer readable medium that stores a set of instructions that is executable by at least one processor of a computer to cause the computer to perform a method for processing video content, the method comprising:
determining whether one or more weighted prediction parameters are signaled in a picture header syntax structure; and
in response to the one or more weighted prediction parameters having been signaled in the picture header syntax structure, determining that the picture header syntax structure is not signaled in a slice header.

42. The non-transitory computer readable medium of clause 41, wherein determining whether the one or more weighted prediction parameters are signaled in the picture header syntax structure comprises:
receiving a first flag from a bitstream; and
determining whether the one or more weighted prediction parameters are signaled in the picture header syntax structure according to a value of the first flag.

43. The non-transitory computer readable medium of clause 42, wherein the first flag is present in a Picture Parameter Set (PPS).

44. The non-transitory computer readable medium of clause 41, wherein the at least one processor configured to execute the set of instructions to cause the computer to further perform:
in response to the one or more weighted prediction parameters having been signaled in the picture header syntax structure, determining that picture header syntax structure is signaled in a PH NAL unit.

45. A non-transitory computer readable medium that stores a set of instructions that is executable by at least one processor of a computer to cause the computer to perform a method for processing video content, the method comprising:
in response to a slice type being signaled in a slice header, determining whether the slice type is a B slice; and
in response to the slice type being the B slice, signaling one or more weighted prediction parameters for a reference list in the slice header.

46. A non-transitory computer readable medium that stores a set of instructions that is executable by at least one processor of a computer to cause the computer to perform a method for processing video content, the method comprising:
in response to receiving an end-of-sequence (EOS) network-abstraction-layer (NAL) unit, determining that an end of a picture unit (PU) has been reached.

47. The non-transitory computer readable medium of clause 46, wherein the at least one processor configured to execute the set of instructions to cause the computer to further perform:
in response to the end of the PU having been reached, determining that a current video-coding-layer (VCL) NAL unit subsequent to the end of the PU is a first VCL NAL unit in a coded layer video sequence (CLVS);
determining whether the current VCL NAL unit follows a picture-header (PH) NAL unit; and
in response to the current VCL NAL unit following the PH NAL unit, setting a variable of the current VCL NAL unit to be a first value, the first value indicating a PH structure being signaled in the PH NAL unit, or
in response to the current VCL NAL unit not following the PH NAL unit, setting the variable of the current VCL NAL unit to be a second value, the second value indicating the PH structure being signaled in a slice header of the current VCL NAL unit.

48. The non-transitory computer readable medium of clause 47, wherein the at least one processor configured to execute the set of instructions to cause the computer to further perform:
setting the variable of a subsequent VCL NAL unit after the current VCL NAL unit to be the value of the variable of the current VCL NAL unit.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented method for processing video content, comprising:
    determining whether a picture-header (PH) network-abstraction-layer (NAL) unit is present in a picture unit (PU);
    determining, based on presence or absence of the PH NAL unit in the PU, whether the PU has only one video-coding-layer (VCL) NAL unit and whether a first VCL NAL unit of the PU is the VCL NAL unit in the PU, wherein, in response to the PH NAL unit being not present in the PU, the PU is determined to have only one VCL NAL unit and the first VCL NAL unit of the PU is determined to be the VCL NAL unit in the PU; and
    determining whether the first VCL NAL unit of the PU is the first VCL NAL unit of an access unit (AU) containing the PU.

2. The method of claim 1, wherein determining whether the first VCL NAL unit of the PU is the first VCL NAL unit of the AU containing the PU comprises:
    determining whether a value of a parameter of the first VCL NAL unit is different from a value of a parameter of a previous picture; and
    in response to the value of the parameter of the first VCL NAL unit being different from the value of the parameter of the previous picture, determining that the first VCL NAL unit is the first VCL NAL unit of the AU containing the PU.

3. The method of claim 2, wherein the parameter comprises a layer identifier, and determining whether the value of the parameter of the first VCL NAL unit is different from the value of the parameter of the previous picture comprises:
    determining whether the value of the layer identifier of the first VCL NAL unit of the PU is different from the value of the layer identifier of the previous picture.

4. The method of claim 2, wherein the parameter comprises a picture order count (POC) variable, and determining whether the value of the parameter of the first VCL NAL unit of the PU is different from the value of the parameter of the previous picture comprises:
    determining whether the value of the POC variable of the first VCL NAL unit of the PU is different from the value of the POC variable of the previous picture.

5. An apparatus for processing video content, comprising:
    a memory storing a set of instructions; and
    one or more processors configured to execute the set of instructions to cause the apparatus to perform:
        determining whether a picture-header (PH) network-abstraction-layer (NAL) unit is present in a picture unit (PU);
        determining, based on presence or absence of the PH NAL unit in the PU, whether the PU has only one video-coding-layer (VCL) NAL unit and whether a first VCL NAL unit of the PU is the VCL NAL unit in the PU, wherein, in response to the PH NAL unit being not present in the PU, the PU is determined to have only one VCL NAL unit and the first VCL NAL unit of the PU is determined to be the VCL NAL unit in the PU; and
        determining whether the first VCL NAL unit of the PU is the first VCL NAL unit of an access unit (AU) containing the PU.

6. The apparatus of claim 5, wherein determining whether the first VCL NAL unit of the PU is the first VCL NAL unit of the AU containing the PU comprises:
    determining whether a value of a parameter of the first VCL NAL unit is different from a value of a parameter of a previous picture; and
    in response to the value of the parameter of the first VCL NAL unit being different from the value of the parameter of the previous picture, determining that the first VCL NAL unit is the first VCL NAL unit of the AU containing the PU.

7. The apparatus of claim 6, wherein the parameter comprises a layer identifier, and determining whether the value of the parameter of the first VCL NAL unit is different from the value of the parameter of the previous picture comprises:
    determining whether the value of the layer identifier of the first VCL NAL unit of the PU is different from the value of the layer identifier of the previous picture.

8. The apparatus of claim 6, wherein the parameter comprises a picture order count (POC) variable, and determining whether the value of the parameter of the first VCL NAL unit of the PU is different from the value of the parameter of the previous picture comprises:
  determining whether the value of the POC variable of the first VCL NAL unit of the PU is different from the value of the POC variable of the previous picture.

9. A non-transitory computer readable medium that stores a bitstream of video, wherein the bitstream comprises a picture unit (PU) and is for processing according to a method comprising:
  determining whether a picture-header (PH) network-abstraction-layer (NAL) unit is present in the PU;
  determining, based on presence or absence of the PH NAL unit in the PU, whether the PU has only one video-coding-layer (VCL) NAL unit and whether a first VCL NAL unit of the PU is the VCL NAL unit in the PU, wherein, in response to the PH NAL unit being not present in the PU, the PU is determined to have only one VCL NAL unit and the first VCL NAL unit of the PU is determined to be the VCL NAL unit in the PU; and
  determining whether the first VCL NAL unit of the PU is the first VCL NAL unit of an access unit (AU) containing the PU.

10. The non-transitory computer readable medium of claim 9, wherein
  determining whether the first VCL NAL unit of the PU is the first VCL NAL unit of the AU containing the PU comprises:
    determining whether a value of a parameter of the first VCL NAL unit is different from a value of a parameter of a previous picture; and
    in response to the value of the parameter of the first VCL NAL unit being different from the value of the parameter of the previous picture, determining that the first VCL NAL unit is the first VCL NAL unit of the AU containing the PU.

11. The non-transitory computer readable medium of claim 10,
  wherein the parameter comprises a layer identifier, and determining whether the value of the parameter of the first VCL NAL unit is different from the value of the parameter of the previous picture comprises:
    determining whether the value of the layer identifier of the first VCL NAL unit of the PU is different from the value of the layer identifier of the previous picture.

12. The non-transitory computer readable medium of claim 10,
  wherein the parameter comprises a picture order count (POC) variable, and determining whether the value of the parameter of the first VCL NAL unit of the PU is different from the value of the parameter of the previous picture comprises:
    determining whether the value of the POC variable of the first VCL NAL unit of the PU is different from the value of the POC variable of the previous picture.

13. The method of claim 1, further comprising:
  determining a VCL NAL unit following an end-of-sequence (EOS) NAL unit to be the first VCL NAL unit of the PU.

14. The method of claim 13, wherein the PU is a first PU, and the method further comprises:
  determining the EOS NAL unit to be an end of a second PU different from the first PU.

15. The apparatus of claim 6, wherein the one or more processors are configured to execute the set of instructions to cause the apparatus to perform:
  determining a VCL NAL unit following an end-of-sequence (EOS) NAL unit to be the first VCL NAL unit of the PU.

16. The apparatus of claim 15, wherein the PU is a first PU, and the one or more processors are configured to execute the set of instructions to cause the apparatus to perform:
  determining the EOS NAL unit to be an end of a second PU different from the first PU.

17. The non-transitory computer readable medium of claim 9, wherein the method further comprises:
  determining a VCL NAL unit following an end-of-sequence (EOS) NAL unit to be the first VCL NAL unit of the PU.

18. The non-transitory computer readable medium of claim 17, wherein the PU is a first PU and the method further comprises:
  determining the EOS NAL unit to be an end of a second PU different from the first PU.

* * * * *